(12) United States Patent
Imazato et al.

(10) Patent No.: US 7,816,043 B2
(45) Date of Patent: Oct. 19, 2010

(54) WATER DISPOSAL SYSTEM, METHOD OF DISPOSING WATER, AND POWER GENERATION APPARATUS

(75) Inventors: Minehisa Imazato, Tokyo (JP); Kiyoshi Yamaura, Kanagawa (JP); Toru Hokari, Kanagawa (JP)

(73) Assignee: Sony Corporation, Tokyo (JP)

( * ) Notice: Subject to any disclaimer, the term of this patent is extended or adjusted under 35 U.S.C. 154(b) by 1207 days.

(21) Appl. No.: 10/509,843

(22) PCT Filed: Apr. 18, 2003

(86) PCT No.: PCT/JP03/05012
§ 371 (c)(1),
(2), (4) Date: Feb. 24, 2005

(87) PCT Pub. No.: WO03/090305
PCT Pub. Date: Oct. 30, 2003

(65) Prior Publication Data
US 2005/0158593 A1      Jul. 21, 2005

(30) Foreign Application Priority Data

Apr. 19, 2002 (JP) .............................. 2002-117319
Dec. 12, 2002 (JP) .............................. 2002-360491
Mar. 18, 2003 (JP) .............................. 2003-073414

(51) Int. Cl.
*H01M 8/02* (2006.01)
*H01M 8/04* (2006.01)

(52) U.S. Cl. .................... 429/414; 429/413; 429/479

(58) Field of Classification Search ................ None
See application file for complete search history.

(56) References Cited

U.S. PATENT DOCUMENTS

| 5,350,643 | A  | * | 9/1994 | Imahashi et al. | ............... 429/33 |
|---|---|---|---|---|---|
| 5,595,834 | A  | * | 1/1997 | Wilson et al. | ................. 429/30 |
| 6,447,945 | B1 | * | 9/2002 | Streckert et al. | .............. 429/34 |
| 6,613,467 | B1 | * | 9/2003 | Chizawa et al. | ............... 429/26 |
| 6,660,419 | B1 | * | 12/2003 | Nishida et al. | ................ 429/32 |
| 2002/0076599 | A1 | * | 6/2002 | Neutzler et al. | .............. 429/38 |
| 2003/0152821 | A1 | * | 8/2003 | Lisi et al. | ...................... 429/34 |

FOREIGN PATENT DOCUMENTS

JP          60-258863        12/1985

(Continued)

*Primary Examiner*—Dah-Wei D Yuan
*Assistant Examiner*—Edu E Enin-Okut
(74) *Attorney, Agent, or Firm*—K&L Gates LLP

(57) ABSTRACT

Water disposal systems, apparatuses and methods that employ same, and methods for disposing water produced during power generation are provided. A separator of a fuel cell has an air supply groove formed therein for supplying air as an oxidizer gas to a cathode. The separator is also provided with water-absorbing cloths on the midway portion of the air supply groove. More specifically, the water-absorbing cloth is provided on the separator (110), as a water absorbing member for absorbing the water, so as to cover at least a part of the surface on which the air supply grooves is formed and the water-absorbing clothes is provided along the sidewall of the air supply grooves. Water generated during power generation by the power generator of the present invention is disposed in efficient and reliable manners, under a simple configuration.

11 Claims, 13 Drawing Sheets

FOREIGN PATENT DOCUMENTS

| | | |
|---|---|---|
| JP | 02-168565 | 6/1990 |
| JP | 02168565 A * | 6/1990 |
| JP | 05-283094 | 10/1993 |
| JP | 07-235324 | 9/1995 |
| JP | 09-213359 | 8/1997 |
| JP | 10-162842 | 6/1998 |
| JP | 10-289723 | 10/1998 |
| JP | 11-097041 | 4/1999 |
| JP | 2001-011032 | 1/2001 |
| JP | 2001-332274 | 11/2001 |
| WO | WO 00/14819 | 3/2000 |

* cited by examiner

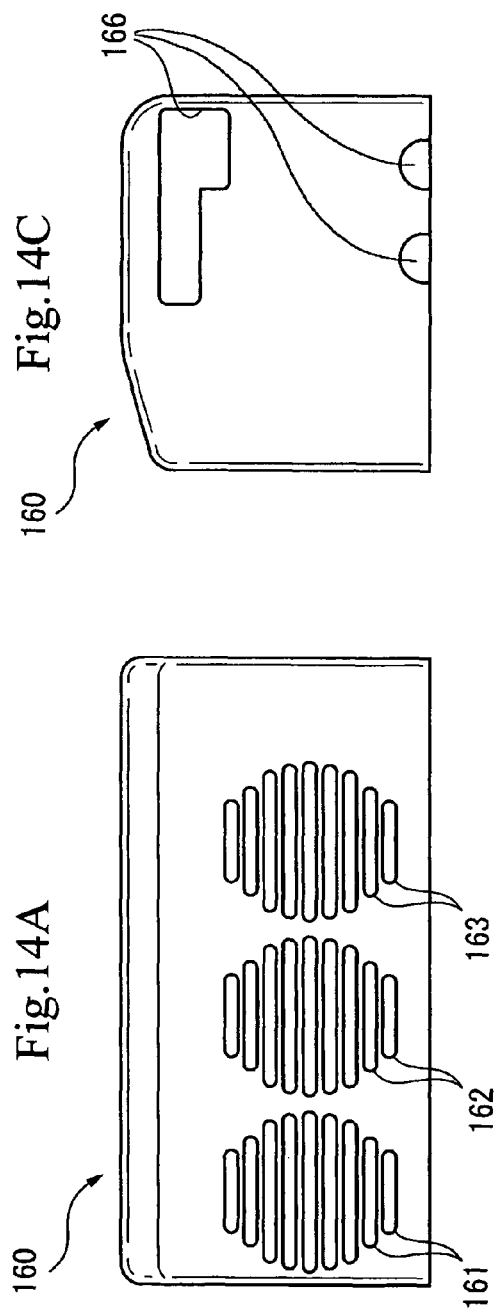
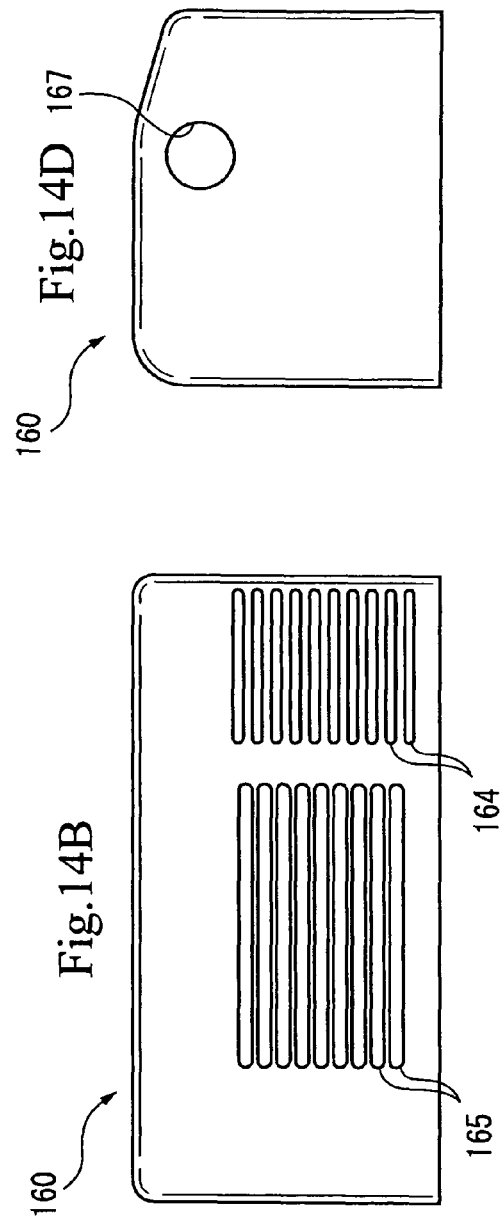

WATER DISPOSAL SYSTEM, METHOD OF DISPOSING WATER, AND POWER GENERATION APPARATUS

CROSS REFERENCES TO RELATED APPLICATIONS

The present application claims priority to Japanese Patent Document Nos. P2002-117319 filed on Apr. 19, 2002, P2002-360491 filed on Dec. 12, 2002; and P2003-073414 filed on Mar. 18, 2003 the disclosures of which are herein incorporated by reference.

BACKGROUND OF THE INVENTION

The present invention relates to a water disposal system and a method of disposing water for disposing water produced during power generation by a power generator, and a power generation apparatus using the water disposal system and the method of disposing water, for disposing water produced during power generation.

Fuel cell is a device which supplies a fuel gas, such as hydrogen, together with oxygen (air), and allows the fuel gas and oxygen to electrochemically react with each other to thereby generate electric power on a power generator. The fuel cell is much hopeful for applications to electric cars or hybrid vehicles, in a form of being mounted as a motive power source on vehicles including automobiles, and its structural features capable of facilitating weight reduction or downsizing have been promoting approaches of applying it not only to the current dry cell or rechargeable battery, but also to the field of electric communication such as portable devices, field of power tools, field of general home electric appliances, field of lighting, field of emergency non-interruptive power source and field of munitions.

One known configuration of the fuel cell is such as having a predetermined electrolyte film, which is typically a proton conductor film, provided between an anode as the hydrogen-side electrode and a cathode as the oxygen-side electrode, wherein each electrode configures a cell structure together with a catalyst layer containing a catalyst added so as to allow source materials supplied to each electrode to react, and a diffusion layer portion for guiding the reaction materials to the catalyst, and a plurality of this sort of cells are stacked. In thus-configured fuel cell, a dissociative reaction of hydrogen gas ($H_2$) into a proton ($H^+$) and an electron ($e^-$) occurs. In the fuel cell, proton ($H^+$) migrates from the anode side towards the cathode side through the proton conductor film, and at the same time electron ($e^-$) migrates towards the cathode through a predetermined external circuit, so as to proceed a reaction of producing water from oxygen (air), proton ($H^+$) and electron ($e^-$), and this results in generation of a predetermined electromotive force.

In thus-configured fuel cell, it is necessary to smoothly feed the supplied source materials to the catalyst layer so as to allow the reaction to proceed. It is, however, known that the water produced at the cathode or water back-diffused through the proton conductor film towards the anode side interferes flow of the supplied source material such as hydrogen gas, or stagnates in air feed grooves for feeding oxygen (air), and this is causative of lowering in the power generation efficiency.

In order to remove the water, the fuel cell generally adopts a technique of blowing the water in its liquid form making use of flow rate of the gas, or a technique of discharging the water in its liquid form with the aid of gravity.

The fuel cell based on the technique of discharging the water in its liquid form with the aid of gravity is, however, not applicable to small-sized devices such as portable electronic devices, because placement of the device is limited. On the other hand, the technique of blowing the water in its liquid form is not practical because it is realizable only by using a large-sized pump. It is therefore necessary for the fuel cell to discharge the water in its liquid form by using a small-sized pump fan or to allow the water to dry with air, if it is desired to be applied to the small devices.

As a specific technique of discharging the water from the catalyst layer or from the diffusion layer, there is proposed a technique disclosed in Patent Document 1 (Japanese Patent Application Publication No. Hei 10-289723).

Patent Document 1 discloses a fuel cell having a cathode-side current collector composed of a synthetic member which includes a base having a carbon fiber skeleton, and a porous mixture layer formed in a hole owned by the base, wherein the porous mixture layer is formed by firing a mixed paste of a water-repellent second filler and a first filler having a water repellency smaller than that of the second filler, and at least either one of the cathode-side current collector and anode-side current collector has water moving means for moving the water from the interface between itself and the electrode in contact therewith towards the back side of the current collector. It is explained that this fuel cell is advantageous in that the gas supply to the cathode will not be interfered, because the reaction water generated at the cathode can move through a path formed by grains of the first filler sequentially arranged in the thickness-wise direction of the current collector.

Other techniques of ensuring the gas flow by discharging the water from the air supply groove are proposed in Patent Document 2 (Japanese Patent Application Publication No. Hei 11-97041) and Patent Document 3 (Japanese Patent Application Publication No. 2001-11032).

Patent Document 2 discloses a solid-polymer-type fuel cell in which part of wall surface of the supply groove on the anode side are subjected to water-repellent treatment and hydrophilization treatment so as to form a water-repellent region and a hydrophilic region. It is explained that this solid-polymer-type fuel cell is successful in ensuring a path of the gas by forming the water-repellent region and hydrophilic region.

Patent Document 3 discloses a polymer-electrolyte-type fuel cell having a flow path for removing water, provided on at least any one of an anode, a cathode, and a pair of separators having, formed thereon, the supply grooves for supplying the gas to the anode and cathode. It is explained that this polymer-electrolyte-type fuel cell is successful in separating the water discharge and gas flow by disposing the flow path for removing water generated on the cathode side, and in avoiding clogging of the gas flow path.

The aforementioned technique described in Patent Document 1, however, suffers from a problem in that the water cannot completely be discharged from the diffusion layer to the external, and the water stayed in the internal becomes water droplets to thereby interfere the gas supply to the catalyst layer. The technique also raises a problem in that the water interferes flow of the source materials also on the anode side, because the amount of water back-diffused through the proton conductor film towards the anode side increases unless otherwise the water generated on the cathode side is successfully discharged to the external.

The water in problem may be discharged as being carried by a gas flow under control of pressure or flow rate of oxygen or air at the cathode, but it is difficult for flat-type or small-sized power generation cells, having a cathode often configured as of open air type, to discharge the water as being carried by the gas flow under control of pressure and flow rate of the gas. In particular for the case where this sort of power generation cell is mounted on any portable electronic devices, it is difficult to newly add a device for controlling the pressure or flow rate of the gas for disposing the water, so that the generated water, diffused in a form of droplets, may be causative of malfunctions due to water scattering to the peripheral devices.

Other possible methods may be such as blowing the water with the aid of some external device or naturally-occurred air flow, or discharging the water assisted by the self weight of the water droplets. It is, however, anticipated that these methods may undesirably result in scattering of the released water droplets towards unintended places, unless the device is directed within a predetermined range with respect to the air flow or gravity. Self-contained configuration of the power generation cell into a predetermined device raises problems not only in degradation in performances of the fuel cell, but also in releasing of the water per se in the device.

There is an idea of allowing the generated water droplets to flow along pipes, grooves or the like to thereby recover the water droplets in a predetermined site, but this inevitably requires an additional function of supplying energy for the recovery, against expectations for downsizing and improvement in efficiency of the device. For example in the technique described in Patent Document 4 (Japanese Patent Application Publication No. Hei 9-213359) in which the water generated at the cathode is recovered and used for moistening the anode, amount of generated water increases as the duration of time of power generation becomes longer, and the water must finally be disposed.

The aforementioned technique described in the Patent Document 2, in which the water droplets are discharged through a long air supply groove for supplying the air without being assisted by gravity, was suffering from a problem of needing a large-sized pump.

The aforementioned technique described in the Patent Document 3 was suffering from a problem in that the water entered the flow path for removing water may be discharged, but the water entered the air supply groove cannot be discharged at all.

SUMMARY OF THE INVENTION

The present invention provides in an embodiment a water disposal system and a method of disposing water capable of disposing water, which is produced during power generation by a power generator, under a simple configuration in efficient and reliable manners, and to provide a power generation apparatus using the water disposal system and the method of disposing water.

A water disposal system of the present invention in an embodiment includes a water disposal system for disposing water generated during power generation by a power generator that includes a water-absorbing member provided to the power generator as being extended therefrom, for recovering and moving the water with the aid of capillary phenomenon, and a water-retaining member for temporarily accumulating the water.

The water disposal system of the present invention can recover the water generated during power generation by the power generator, and can dispose the water without allowing it to stagnate inside the power generator.

The power generator herein is a fuel cell having an anode supplied with a substance mainly composed of hydrogen as an active material, a cathode exposed to the open air and supplied with oxygen as an active material, and an electrolyte film as being held between the anode and cathode. In the water disposal system of the present invention, the cathode has a current collector formed thereon, the current collector has, as formed therein, an opening through which oxygen is supplied to the cathode, and the opening has a water-absorbing member formed on the circumference thereof. More specifically, the water-absorbing member is formed so as to surround the circumferential portion of the opening, to cover the opening, and to reach the cathode.

The water disposal system of the present invention, assuming now as having an open-air-type fuel cell as the power generator, can recover the water using the water-absorbing member formed on the circumferential portion of the opening of the current collector, provided for allowing oxygen supply through exposure to the air. The water disposal system of the present invention can efficiently absorb the water by forming the water-absorbing member so as to surround the circumferential portion of the opening of the current collector where the water is most likely to occur, and can dispose the water without allowing it to stagnate inside the power generator.

The water disposal system of the present invention, configured so that the water-absorbing member absorbs the water from the power generator and allows it to evaporate into the air, can dispose the water without being added with any device for controlling pressure or flow rate of the gas.

The water disposal system of the present invention can efficiently absorb, move and dispose the water with the aid of the water-absorbing member, and this makes it possible to avoid interference of hydrogen gas supply to the catalytic portion due to the water back-diffused through the electrolyte film to reach the anode, and to avoid interference of air supply to the catalyst layer due to clogging of the opening portion by the water. The water disposal system of the present invention is also successful in preventing output of the fuel cell from decreasing, because the water can be discharged from the cathode side.

The water-absorbing member of the water disposal system of the present invention is composed of a string-formed material having a void portion formed therein in the longitudinal direction thereof, or a porous material having recessed portions on the surface thereof.

The water disposal system of the present invention can, therefore, cause capillary phenomenon at the site of the water-absorbing member, can readily recover the water making use of the capillary phenomenon, and can also move the water again making use of the capillary phenomenon. Because the water-absorbing member can move the water making use of the capillary phenomenon, it can absorb and move the water irrespective of the orientation of the water-absorbing member with respect to the air flow or gravity.

The water-absorbing member can dispose the water recovered from the surface of the power generator by allowing it to evaporate into the air, so that it can dispose the water which increases with duration of time of power generation, in simple and efficient manners, without need of any additional functions for disposing the water or any device for energy supply. In particular, it can keep on disposing the water in a simple manner in downsized power generation apparatuses.

In the water disposal system of the present invention, the water-absorbing member is provided on the surface of an electronic device to which the power generator is mounted, as being extended therefrom. The water-absorbing member can therefore move the recovered water to the surface of the electronic device, and can allow the water to surely evaporate into the air on the surface of the electronic device, which is larger in area as compared with that of the power generator. Because the water disposal system of the present invention can surely dispose the water, it can prevent the power generator incorporated into the electronic device from being degraded in the performance due to the water, and can also prevent the water from scattering around the device, and this is successful in avoiding malfunctions of the device due to scattering of the water.

Furthermore, the water-absorbing member in the water disposal system of the present invention has an irregular-shaped portion or a projected portion. The water disposal system of the present invention is, therefore, successful in increasing an area of the water-absorbing member in contact with the air, and in increasing the amount of evaporation of the water with increase in the area in contact with the air. The water disposal system of the present invention can readily vary the amount of evaporation of the water to be evaporated by modifying the structure of the water-absorbing member, such as providing the irregular-shaped portion or the projected portion, and can therefore adjust the water content inside the power generator by adjusting the amount of recovery of the water recovered by the water-absorbing member.

The water disposal system of the present invention in an embodiment has a water-retaining member for temporarily accumulating the water generated by the power generator.

Through the recovery of the water by the water-absorbing member and the succeeding accumulation of the water by the water-retaining member, the water disposal system of the present invention can, therefore, adjust the amount of evaporation of the water evaporated from the water-absorbing member. The water disposal system of the present invention can also adjust the amount of accumulation of the water to temporarily be accumulated by adjusting the capacity or the like of the water-retaining member, and can adjust the amount of recovery of the water to be recovered by the water-absorbing member by adjusting the amount of evaporation of the water to be evaporated from the water-absorbing member, and thereby the water content inside the power generator can be adjusted.

The water-retaining member herein is provided between the water-absorbing member and the electronic device. The water disposal system of the present invention can, therefore, recover the water even if scattered around the electronic device, with the aid of the water-retaining member disposed on the surface of the electronic device, and can successfully avoid malfunctions of the device caused by the scattering of the water.

The water disposal system of the present invention further including in an embodiment at least a water-absorbing layer having water absorbency, air permeability and electro-conductivity, provided between the diffusion layer and the current collector.

In thus-configured water disposal system of the present invention, the water in the diffusion layer is absorbed by the water-absorbing layer, and the water absorbed by the water-absorbing layer is further absorbed by the water-absorbing member partially brought into contact with the water-absorbing layer, so that this is successful in further improving efficiencies in the water absorption, and consequently in collection of generated electricity.

A method of disposing water of the present invention in an embodiment includes a method of disposing water generated during power generation by a power generator, including recovering and moving the water with the aid of capillary phenomenon, to thereby dispose it to the external of the power generator, or to dispose it to the external of the power generator after temporary accumulation thereof.

Thus-configured method of disposing water of the present invention can dispose the water without allowing it to stagnate inside the power generator, by recovering the water generated during power generation by the power generator with the aid of the water-absorbing member.

A power generation apparatus of the present invention in an embodiment includes a power generation apparatus for generating electric power by supplying a fuel gas and an oxidizer gas, and by allowing the fuel gas and oxidizer gas to electrochemically react with each other to thereby generate electric power, and characterized by including a water-absorbing member for recovering and moving the water generated by the power generator, with the aid of capillary phenomenon.

Thus-configured power generation apparatus of the present invention can stabilize the power generation efficiency, because the water generated during power generation by the power generator is recovered by the water-absorbing member, and disposed without allowing it to stagnate inside the power generator.

The water disposal system of the present invention in an embodiment includes a water disposal system for disposing the water generated during power generation by the power generator, including a separator having, formed thereon, a fuel supply groove for supplying a fuel gas to a first electrode and an oxidizer supply groove for supplying an oxidizer gas to a second electrode, and for holding the power generator, and a water disposal means for disposing the water, provided at least on the midway portion of the oxidizer supply groove.

Thus-configured water disposal system of the present invention is successful in preventing the oxidizer supply groove from being clogged due to stagnation of the water, because the water can be disposed by the water disposal means provided on the midway region of the oxidizer supply groove. The water disposal system of the present invention is therefore successful in avoiding interference of flow of the oxidizer gas through the oxidizer supply groove.

The water disposal means herein may be configured by using a water-absorbing member capable of absorbing the water. It is particularly preferable that the water disposal means is provided along at least a partial region of the sidewall of the oxidizer supply groove.

Thus-configured water disposal system of the present invention is successful in directly absorbing the water generated in the oxidizer supply groove.

It is also allowable to configure the water disposal system of the present invention, so that a water-absorbing member is provided so as to cover at least a part of the surface having the oxidizer supply groove formed therein.

Thus-configured water disposal system of the present invention allows the water to be absorbed by the water-absorbing means provided along the partial region of the sidewall of the oxidizer supply groove, then allow it to diffuse towards a place distant from the power generator, with the aid of the water-absorbing member provided so as to cover at least a part of the surface having the oxidizer supply groove formed therein, without using any external means.

Furthermore, in the water disposal system of the present invention, the separator has, formed thereon, a heat sink portion for dissipating heat of the power generator, and the water-absorbing member provided so as to cover at least a part of the surface having the oxidizer supply groove formed therein is arranged so as to show a predetermined shape extended from the surface having the heat sink portion formed therein, and so that the region having the predetermined shape covers at least a part of the oxidizer supply groove.

Thus-configured water disposal system of the present invention can diffuse the water towards the heat sink portion distant from the power generator, and can allow the water to evaporate at the heat sink portion in efficient and reliable manners.

The water-absorbing member is preferably such as absorbing the water with the aid of capillary phenomenon.

Thus-configured water disposal system of the present invention can diffuse the water over the entire region of the water-absorbing member, and this makes it possible to increase the water disposal rate, and to absorb the water in extremely efficient and reliable manners. In the water disposal system of the present invention, the water-absorbing member can play a role of a buffer for temporarily retaining the water, and can respond to any variation in evaporation rate of the water depending on environmental humidity.

One example of this sort of water-absorbing member for absorbing the water with the aid of capillary phenomenon is such as that configured as an aggregate of string-formed fiber having a void portion formed therein in the longitudinal direction thereof.

It is further preferable that the water-absorbing member includes a three-layered structure in which a two-layered structure, including a first material having a water-absorbing/releasing property and a second material having a water absorbency bonded with each other, is further bonded with a predetermined tape material on the lower side of the second material. The second material is preferably the one such as absorbing the water with the aid of capillary phenomenon.

Because the water disposal system of the present invention uses the water-absorbing member having a predetermined tape material in the lowermost layer thereof, it is made possible to successfully prevents the portion covering the oxidizer supply groove from sagging, so as to stabilize the shape, and to realize easy processing and formation, involving cutting, of the water-absorbing member.

In the water-absorbing member having the three-layered structure, the second material is preferably such as absorbing the water with the aid of capillary phenomenon.

It is also allowable that the water disposal system of the present invention uses, as the water disposal means, the oxidizer supply groove having a roughened surface, and it is further allowable to use the oxidizer supply groove having a high water-repellent region and a high hydrophilic region formed therein.

Also by using thus-configured water disposal means, the water disposal system of the present invention is successful in preventing the oxidizer supply groove from being clogged due to stagnation of the water, and is successful in avoiding interference of flow of the oxidizer gas through the oxidizer supply groove.

The water disposal system of the present invention further including in an embodiment a water-absorbing layer having at least water absorbency, air permeability and electro-conductivity, between the diffusion layer and the separator.

In thus-configured water disposal system of the present invention, the water in the diffusion layer is absorbed by the water-absorbing layer, and the water absorbed by the water-absorbing layer is further disposed by the water-absorbing member partially brought into contact with the water-absorbing layer, so that this is successful in further improving efficiencies in the water disposal, and consequently in collection of generated electricity.

A method of disposing water of the present invention in an embodiment includes a method of disposing the water generated during power generation by the power generator, and including a power generation step in which a fuel gas is supplied to a first electrode through a fuel supply groove formed on a separator which holds a power generator, and at the same time an oxidizer gas is supplied to a second electrode through an oxidizer supply groove formed on the separator, to thereby allow the power generator to generate electric power, and a water disposal step for disposing the water using a water disposal means provided on the midway region of an oxidizer supply groove.

By disposing the water by the water disposal means provided on at least the midway of the oxidizer supply groove, the method of disposing water of the present invention is successful in preventing the oxidizer supply groove from being clogged due to stagnation of the water, and is successful in avoiding interference of flow of the oxidizer gas through the oxidizer supply groove.

A power generation apparatus of the present invention in an embodiment includes a power generation apparatus for generating electric power by supplying a fuel gas and an oxidizer gas, and by allowing the fuel gas and oxidizer gas to electrochemically react with each other, and including a power generator having a predetermined electrolyte film provided between a first electrode and a second electrode, a separator having, formed thereon, a fuel supply groove for supplying a fuel gas to the first electrode and an oxidizer supply groove for supplying an oxidizer gas to the second electrode, and for holding the power generator, and a water disposal means for disposing the water generated during power generation by the power generator, provided at least on the midway portion of the oxidizer supply groove.

By disposing the water by the water disposal means provided on at least the midway of the oxidizer supply groove, the power generation apparatus of the present invention is successful in preventing the oxidizer supply groove from being clogged due to stagnation of the water. The power generation apparatus of the present invention is, therefore, successful in avoiding interference of flow of the oxidizer gas through the oxidizer supply groove, and in stabilizing the power generation efficiency.

Additional features and advantages of the present invention are described in, and will be apparent from, the following Detailed Description of the Invention and the figures.

BRIEF DESCRIPTION OF THE FIGURES

FIG. 14A is a structural drawing of a housing constituting the same fuel cell, and is a front elevation of one aspect thereof.

FIG. 14B is a structural drawing of a housing constituting the same fuel cell, and is a rear elevation of the other aspect thereof.

FIG. 14C is a structural drawing of a housing constituting the same fuel cell, and is a side elevation of one end thereof.

FIG. 14D is a structural drawing of a housing constituting the same fuel cell, and is a side elevation of the other end thereof.

DETAILED DESCRIPTION OF THE INVENTION

The present invention provides in an embodiment a water disposal system and a method of disposing water capable of disposing water, which is produced during power generation by a power generator, under a simple configuration in efficient and reliable manners, and to provide a power generation apparatus using the water disposal system and the method of disposing water.

The following paragraphs will describe specific embodiments to which the present invention is applied, referring to the attached drawings.

This embodiments relates to a fuel cell as a power generation apparatus which supplies hydrogen as a fuel gas and air as an oxidizer gas, and allows the hydrogen and the air to electrochemically react with each other to thereby generate electric power on a power generator, and a water disposal system applied to the fuel cell.

First, the water disposal system exemplified as a first embodiment will be explained.

Figure 1:
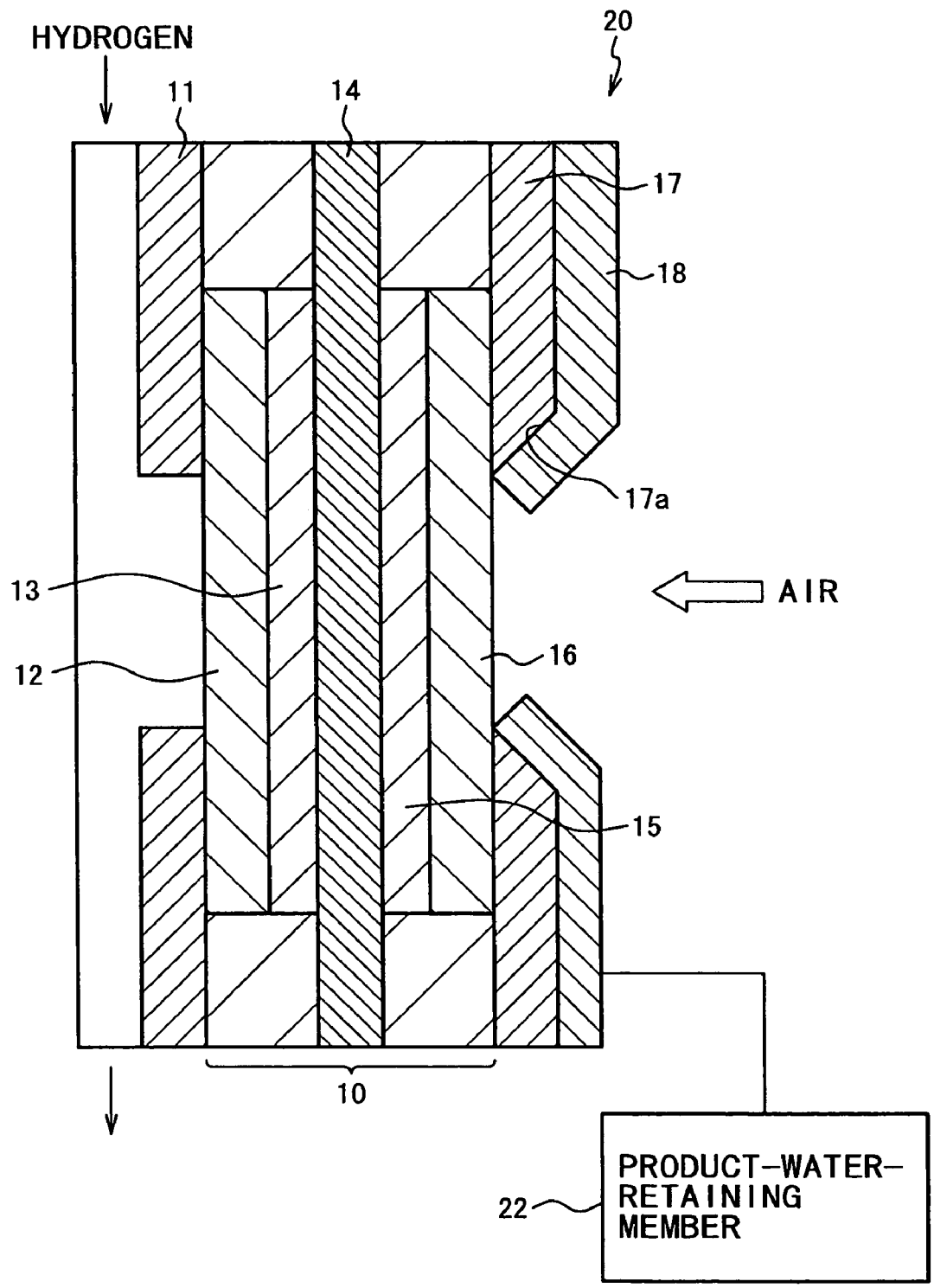
FIG. 1 is a sectional view showing a configuration of a power generation apparatus using a water disposal system in an embodiment of the present invention.

FIG. 1 is a sectional view showing an exemplary power generation apparatus to which the water disposal system is applied. The water disposal system has a power generator, a water-absorbing member disposed to the power generator as being extended therefrom, for recovering and moving the water with the aid of capillary phenomenon, and a water-retaining member for temporarily accumulating the water.

More specifically as shown in the figure, a power generation apparatus 20 has, as major constituents, a hydrogen-side current collector 11 provided to an anode which corresponds to a hydrogen-side electrode, an oxygen-side current collector 17 provided to a cathode which corresponds to an oxygen-side electrode, and a power generator 10 held between the hydrogen-side current collector 11 and oxygen-side current collector 17.

On the oxygen-side current collector 17 of the power generation apparatus 20, there is disposed a water-absorbing member 18 for moving the water generated at the cathode. The water-absorbing member 18 is formed in the circumferential portion of an opening portion 17a of the oxygen-side current collector 17, described later, so as to allow oxygen supply to the cathode through the opening portion 17a, and so as not to interfere contact the cathode to the air at the opening portion 17a.

The anode of the power generation apparatus 20 is supplied with a substance such as hydrogen ($H_2$), methanol or the like, as a fuel from a hydrogen-occlusion cartridge as a fuel. The cathode of the power generation apparatus 20 is supplied with oxygen (air). The oxygen-side current collector 17 herein has the opening portion 17a formed therein as described in the above, wherein an oxygen-side diffusion layer 16 is exposed to the air through the opening portion 17a, and thereby oxygen is supplied to the cathode.

As schematically shown in the drawing, the water-absorbing member 18 formed on the power generation apparatus 20 joints with a water-retaining member 22 which temporarily accumulates the water produced during power generation by the power generator 10. The water-retaining member 22 is provided in contact with the water-absorbing member 18, and on the surface of an electronic device, as described later.

The power generator 10 is configured by stacking an oxygen-side diffusion layer 16 in contact with the oxygen-side current collector 17, an oxygen-side catalyst layer 15 for allowing oxygen from the oxygen-side diffusion layer 16 to react with electron ($e^-$) and proton ($H^+$) from the anode to thereby produce water, an electrolyte film 14 allowing migration of proton ($H^+$), a hydrogen-side catalyst layer 13 for producing electron ($e^-$) and proton ($H^+$) movable to the cathode, and a hydrogen-side diffusion layer 12 in contact with the hydrogen-side current collector 11.

In thus-configured power generator 10, oxygen in the open air coming through the opening portion 17a of the oxygen-side current collector 17 is diffused in the oxygen-side diffusion layer 16, the diffused oxygen allows a reaction expressed as $\frac{1}{2}O_2 + 2H^+ + 2e^- = H_2O$ to proceed in the oxygen-side catalyst layer 15, wherein water is produced during power generation in this time. The hydrogen-side catalyst layer 13, hydrogen-side diffusion layer 12, and hydrogen-side current collector 11 herein configure a fuel cell. Hydrogen supplied as a fuel is diffused in the hydrogen-side diffusion layer 12, and the diffused hydrogen allows a reaction expressed as $H_2 \rightarrow 2H^+ + 2e^-$ to proceed in the hydrogen-side catalyst layer 13, to thereby produce electron ($e^-$) and proton ($H^+$). Proton ($H^+$) generated in the hydrogen-side catalyst layer 13 migrates to the electrolyte film 14, then reaches the oxygen-side catalyst layer 15 and react with oxygen. Electron ($e^-$) reaches the oxygen-side catalyst layer 15 through the oxygen-side current collector 17 with the aid of an external circuit not shown.

The oxygen-side current collector 17 of the power generation apparatus 20 has a plurality of opening portions 17a formed therein, as gas inlet ports for supplying therethrough oxygen in the air to the oxygen-side diffusion layer 16 as described in the above. The water-absorbing member 18 is formed so as to cover the sectional surface of the opening portion 17a. Oxygen is incorporated through the opening portion 17a into the oxygen-side diffusion layer 16 of the power generator 10 opened to the air. It is to be noted that the opening portion may be formed, for example, in the water-absorbing member 18, and more specifically, the opening portion to be formed in the water-absorbing member 18 may be formed so as to be stacked on the opening portion 17a to thereby cover the sectional surface of the opening portion 17a. The opening portion formed in the water-absorbing member 18 herein may have various shapes such as circle, oval, stripe and polygon similarly to the shape of the opening portion 17a in the oxygen-side current collector 17, wherein the shape is preferably such as allowing the oxygen-side diffusion layer 16 to readily contact with the air. Although the water-absorbing member 18 and the oxygen-side current collector 17 herein are separate members, the water-absorbing member may be integrated with the oxygen-side current collector 17 by coating.

The water-absorbing member 18 on the oxygen-side current collector 17 is disposed so as to be in contact with the oxygen-side current collector 17, wherein it is provided to the circumferential portion of the opening portion 17a so as to surround the opening portion 17a provided in order to allow the oxygen-side diffusion layer 16 of the power generator 10 to be opened to the air for oxygen supply, and more specifically, so as to cover the sectional surface of the opening portion 17a for example. In this case, since thus-configured water-absorbing member 18 never closes the opening portion 17a for air supply, it does not interfere the air flow.

Thus-configured, water-absorbing member 18 is composed of a water-absorbing material capable of absorbing water, wherein examples of applicable polymer materials include those of crosslinked polyacrylic acid salt base, isobutylene/maleic acid salt base, starch/polyacrylic acid salt base, PVA (Poly Vinyl Alcohol)/polyacryl base, acryl fiber hydrolysis base, and crosslinked PVA base. The water-absorbing member 18 is preferably such as being capable of moving the water to a predetermined distant place and allowing it to evaporate as described later, and is preferably a material capable of moving the water. Examples of this sort of material include porous metals or porous minerals, hydrophilic carbon, paper, pulp, polymer materials, natural fibers and synthetic fibers, all of which having a recessed portion on the surface thereof. Other known examples of this sort of material are those having a high water absorbency based on the capillary phenomenon, wherein examples of which include polyester/nylon composite material and polyester, which are synthetic fibers in which yarn materials having micro-void regions formed therein as viewed in the cross section across the longitudinal direction thereof are woven lengthwise and crosswise. The water-absorbing member 18 may also be composed of synthetic fibers in which yarn materials having micro-void regions formed therein as viewed in the section taken in the longitudinal direction thereof are bundled.

Examples of the yarn materials having micro-void regions formed therein as viewed in the section taken in the longitudinal direction include composite materials such as polyester/nylon composite material, wherein a known material is such as having, in the center thereof, a nearly-star-shape material having projected portions, and also having the other material formed between every-adjacent projected portions owned by the nearly-star-shape material. In this sort of composite material, the micro-void regions are formed between the nearly-star-shape material and the other material, and the water entering the micro-void regions increases the pressure due to surface tension thereof to thereby exhibit the capillary phenomenon, because the void regions have a small area in the section taken across the longitudinal direction. The micro-void regions may be gaps between the nearly-star-shape material and the other material, or may be micro-grooves formed along the longitudinal direction. By using the yarn materials having micro-void regions formed therein as viewed in the cross section across the longitudinal direction thereof, it is made possible to raise the pressure of water due to surface tension caused by the micro-void regions, to thereby exhibit the capillary phenomenon, and can move, using this capillary phenomenon, and to configure a migration material having a high water absorbency. Use of thus-composed yarn materials also raises surface tension of water between every adjacent yarn materials, and makes it possible to configure a water-absorbing material capable of absorbing water with the aid of surface tension of water.

Referring now to the conventional example, the water produced in the oxygen-side catalyst layer of the cathode enters the oxygen-side diffusion layer. The water entered the oxygen-side diffusion layer then reaches the oxygen-side current collector, forms droplets upon being contact with the air at normal temperature, and condenses on the oxygen-side current collector. In the conventional example, when the steam is converted into the droplets on the oxygen-side current collector as described, the droplets grow as being assisted by the surface tension of water to clog an opening portion which corresponds to the opening portion 17a, and oxygen supply to the oxygen-side catalyst layer is blocked, thereby lowering output of the power generator.

On the contrary, in the power generation apparatus 20, the water-absorbing member 18 is formed in contact with the oxygen-side current collector 17, and the water-absorbing member 18 is formed in the circumferential portion of the opening portion 17a of the oxygen-side current collector 17, so that the water which increases in the opening portion 17a is brought into contact with the water-absorbing member 18 and is absorbed therein. In the power generation apparatus 20, the water brought into contact with the water-absorbing member 18 is sucked by the water-absorbing member 18 with the aid of surface tension of water, wherein, as described in the above, the water-absorbing member 18 configured by the yarn materials exhibits water absorbency which is ascribable to surface tension of water effected between every adjacent yarn materials, and thereby the water is absorbed by the water-absorbing member 18. Furthermore, because the water-absorbing member 18 is configured, as described in the above, as a material having a high water absorbency based on the capillary phenomenon, in which the yarn materials composing the water-absorbing member 18 form the micro-void regions as viewed in the cross section across the longitudinal direction thereof, and can move the absorbed water with the aid of the capillary phenomenon. In the power generation apparatus 20, even the water oozed into the oxygen-side current collector 17 can completely be absorbed by the water-absorbing member 18 having a high water absorbency, and this allows oxygen supply to the power generator 10 while keeping the opening portion 17a in a desirable condition.

As described later, the water-absorbing member 18 moves the absorbed water to the surface of an electronic device, which is larger than the surface of the power generator 10, and allows it to evaporate. As is known from the above, the power generation apparatus 20 makes it possible to cause an efficient evaporation by disposing the water-absorbing member 18 on the electronic device having a larger area, and makes it possible to allow the water-absorbing member 18 to constantly evaporate the water every time the water is absorbed and moved.

As described in the above, by using the water-absorbing member 18 composed of the yarn materials having micro-void regions formed therein as viewed in the cross section across the longitudinal direction thereof, the power generation apparatus 20 can recover and move the water with the aid of the capillary phenomenon generated by the water-absorbing member 18 while ensuring a high water absorbency. The water condensed at the oxygen-side current collector 17 is likely to condense in the circumferential portion of the opening portion 17a particularly in the open-air-type fuel cell such as the power generator 10, wherein the provision of the water-absorbing member 18 in the circumferential portion of the opening portion 17a makes it possible to efficiently recover and move the water upon production thereof. Because the water-absorbing member 18 in the power generation apparatus 20 is provided on the oxygen-side current collector 17, it is also made possible to accelerate evaporation of the water from the water-absorbing member 18 with the aid of heat produced in the oxygen-side current collector 17 by the power generation, and the heat produced by the power generation is used for evaporating the water, so that temperature rise of the power generator due to heat during the power generation is avoidable in an efficient manner. It is to be noted that the water-absorbing member 18 in the power generation apparatus 20 can be configured as being apart from the opening portion 17a so as to absorb the water after being isolated from the oxygen-side current collector 17 with the aid of gravity or air flow, rather than being provided so as to cover the sectional surface of the circumferential portion of the opening portion 17a of the oxygen-side current collector 17.

Figure 2:
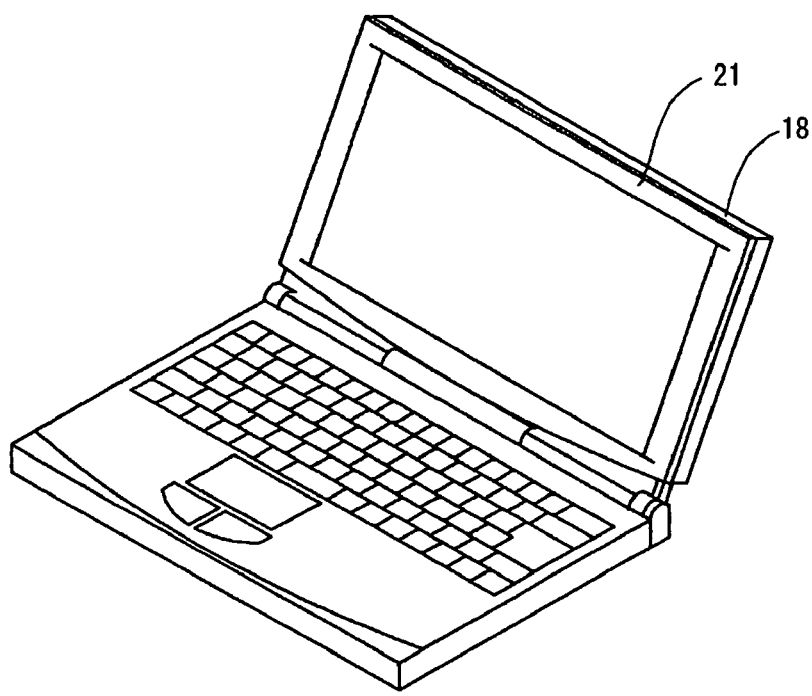
FIG. 2 is a perspective view schematically showing an appearance of a notebook-type personal computer provided with a water-absorbing member.

FIG. 2 is a schematic drawing of an exemplary notebook-type personal computer provided with the water-absorbing member 18. As described in the above, the water-absorbing member 18 is provided in the circumferential portion of the opening portion 17a of the power generation apparatus 20 and recovers the water during the power generation, and moves the recovered water from the surface of the power generator 10 to the back surface of the notebook-type personal computer 21 having a large surface area. The water-absorbing member 18 is therefore provided to the oxygen-side current collector 17, and so that it is extended over the back surface of the notebook-type personal computer 21 which facilitates evaporation of the water. For example, as shown in the drawing, the water-absorbing member 18 is provided over the entire back surface of a display of the notebook-type personal computer 21 housing the power generation apparatus 20. The power generation apparatus 20 to be attached to the notebook-type personal computer 21 as a main unit may also be inserted into a card slot, or may be attached on the bottom surface of the notebook-type personal computer 21, although not illustrated. It is to be noted that the following description will be made on the notebook-type personal computer representing portable electronic devices, wherein the portable electronic devices may also be mobile phones and so forth powered by a fuel cell card.

When a migration material composed of yarn materials having the micro-void regions formed therein as viewed in the cross section across the longitudinal direction thereof are used as the water-absorbing member 18, the water produced at the cathode of the power generation apparatus 20 is recovered by the water-absorbing member 18 with the aid of the capillary phenomenon, and is moved over the entire region of the water-absorbing member 18. In particular for the case where the water-absorbing member 18 is provided on the back surface of the display of the notebook-type personal computer 21, the water can be suck up with the aid of the capillary phenomenon and moved towards the direction opposite to the gravity, even when the display is opened for use of the notebook-type personal computer 21. The suction force herein becomes larger as the sectional area of the water path through which the water is sucked up with the aid of the capillary phenomenon decreases, so that the water-absorbing member 18 will have a higher water absorbency and will more readily suck up the water, as the sectional area of the micro-void regions as viewed in the cross section across the longitudinal direction thereof becomes smaller. Moreover, the water-absorbing member 18 will more readily move the recovered water as the sectional area of the water path through which the water is sucked up with the aid of the capillary phenomenon becomes smaller, and will more readily move the water over the entire region of the water-absorbing member 18. In the notebook-type personal computer 21, the water is moved by the water-absorbing member 18 over the entire region thereof, and the water is then evaporated from the surface portion, in contact with the air, of the water-absorbing member 18 as a moisture-releasing material. As obvious from the above, in the notebook-type personal computer 21, the water recovered by the water-absorbing member 18 can be kept on evaporating from the entire surface of the water-absorbing member 18 formed on the back surface of the display having an area larger than that of the power generator 10, so that the water can readily be disposed through discharge to the external of the power generation apparatus 20, without providing any other device for discharging the water to the external.

As descried in the above, the water produced by the power generator 10 is absorbed by the water-absorbing member 18 in contact with the oxygen-side current collector 17, and move to the entire region of the water-absorbing member 18. In the notebook-type personal computer 21 herein, when the water is absorbed by the water-absorbing member 18, the water is absorbed in the direction opposite to the gravity with the aid of the capillary phenomenon in the water-absorbing member 18. The water-absorbing member 18 formed on the back surface of the notebook-type personal computer 21 can, therefore, absorb the water and allow it to evaporate from the entire back surface of the display of the notebook-type personal computer 21 having a larger area, and can dispose the water in a more efficient manner, even when the notebook-type personal computer 21 is opened for use under power generation. The notebook-type personal computer 21 can also dispose the water and can keep the power generation performance of the power generator 10, even during the power generation which is likely to produce the water, because content of the water contained in the water-absorbing member 18 is lowered through evaporation of the water from the water-absorbing member 18. If the power generation apparatus 20 is attached as a flat-type, large-area power generation apparatus to the bottom portion of the notebook-type personal computer 21, the water-absorbing member 18 for recovering the water from the power generator 10 will have a larger surface area and will be more likely to vaporize the water from the surface thereof, and will allow the water to evaporate into the air in a more efficient manner.

As described in the above, if the water-absorbing member 18 is provided to the oxygen-side current collector 17, so as to recover and move the water produced during the power generation, and so as to allow the water to evaporate into the air for disposal, the power generation apparatus 20 can discharge the water produced in the power generator 10 from the oxygen-side diffusion layer 16, without allowing it to stagnate inside the power generation apparatus 20. The power generation apparatus 20 is, therefore, successful in avoiding interference on the hydrogen gas supply to the hydrogen-side catalyst layer 13, which is possibly caused by the water back-diffused through the electrolyte film 14 towards the anode. The power generation apparatus 20 is also successful in avoiding clogging of the opening portion 17a of the oxygen-side current collector 17 by the water produced by the cathode, in avoiding interference on the air supply to the oxygen-side diffusion layer 16, and consequently in constantly generating power without degrading the power generation performance of the power generator 10. The water-absorbing member 18 of the power generation apparatus 20 is readily adjustable in the capacity and mass thereof, so that adjustment of the capacity or mass of the water-absorbing member 18 makes it possible to easy control of amount of the water possibly absorbed by the water-absorbing member 18, or amount of the water evaporated at the water-absorbing member 18, and this makes it possible to realize power generation optimized based on external environments and output, in a manner less likely to be affected by the external environments such as humidity, temperature and air flow.

The water-absorbing member may be configured in the following shapes.

Figure 3:
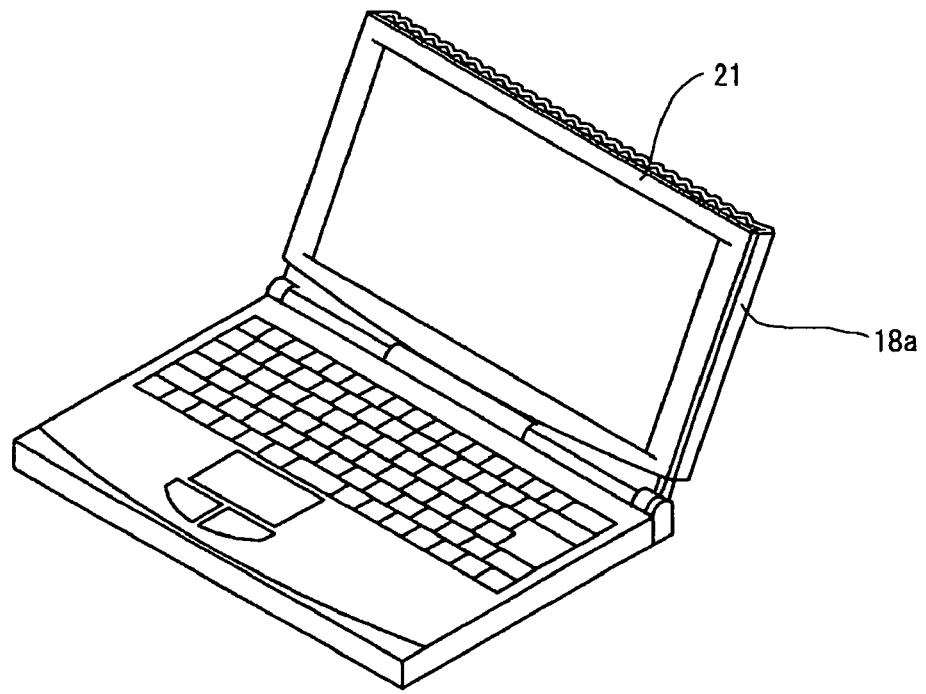
FIG. 3 is a perspective view schematically showing an appearance of a notebook-type personal computer provided with a water-absorbing member having a shape different shape from that of the water-absorbing member shown in FIG. 2.

FIG. 3 shows another exemplary shape of the water-absorbing member formed on the back surface of the notebook-type personal computer 21. The shape of the water-absorbing member 18a shown in the drawing is such as having a saw-tooth-formed irregular portion formed therein. This water-absorbing member 18a is capable of evaporating the absorbed water into the air after moving it over the entire region, wherein the water is more likely to evaporate as the area of the water-absorbing member 18a in contact with the air increases, so that amount of evaporation of the water increases in proportion to the surface area of the water-absorbing member 18a in contact with the air. The shape having the saw-tooth-formed irregular portion formed therein, as being owned by the water-absorbing member 18a shown in the drawing, is therefore successful in increasing the surface area of the water-absorbing member 18a in contact with the air, and in increasing amount of evaporation of the water without increasing a projected area of the water-absorbing member 18a.

Figure 4:
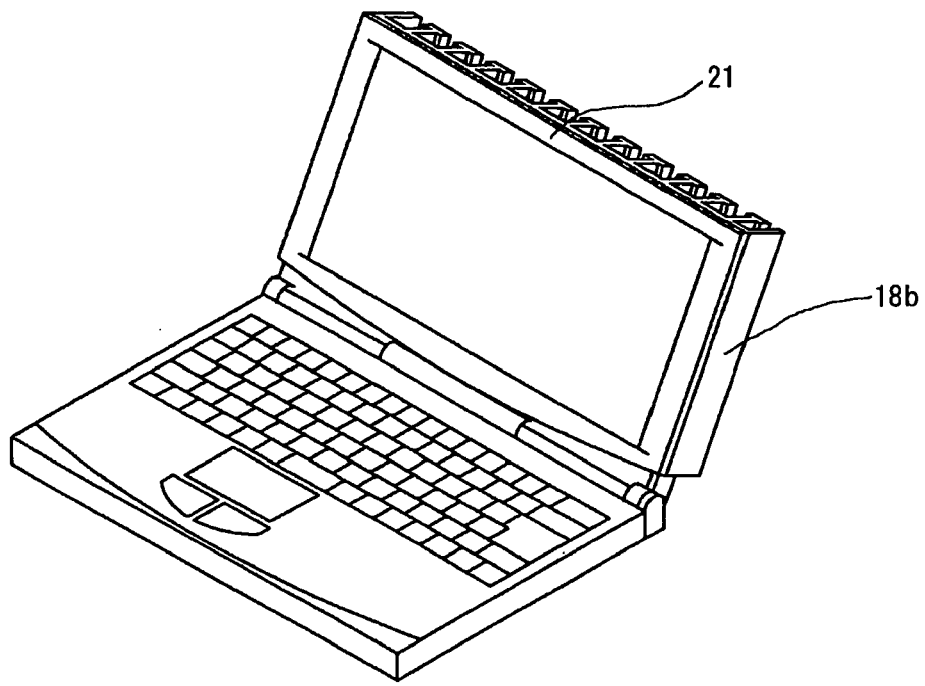
FIG. 4 is a perspective view schematically showing an appearance of a notebook-type personal computer provided with a water-absorbing member having a shape different shape from those of the water-absorbing members shown in FIG. 2 and FIG. 3.

FIG. 4 shows a still another exemplary shape of the water-absorbing member formed on the back surface of the notebook-type personal computer 21. The shape of the water-absorbing member 18b shown in the drawing is such as having projected portions, having a T-formed section, formed on the surface thereof. Similarly to the water-absorbing member 18a shown in FIG. 3, the water is more likely to evaporate as the surface area of the water-absorbing member 18b in contact with the air increases, and can evaporate in proportion to the surface area. The shape having the T-formed projections formed therein, as being owned by the water-absorbing member 18b shown in the drawing, is therefore successful in increasing the surface area of the water-absorbing member 18b in contact with the air, and in increasing amount of evaporation of the water without increasing a projected area of the water-absorbing member 18b.

As described in the above, the water-absorbing member 18 can increase the surface area thereof in contact with the air, by making the shape thereof in various three-dimensional forms, and can efficiently increase the amount of water to be disposed through evaporation, with increase in the area in contact with the air. It is necessary for the anode to have an appropriate amount of water in order to guide hydrogen into the hydrogen-side diffusion layer 12, wherein it is possible to control the amount of absorption of the water to be absorbed by the water-absorbing member 18 by modifying the shape, and thereby varying the surface area, of the water-absorbing member 18.

Figure 5:
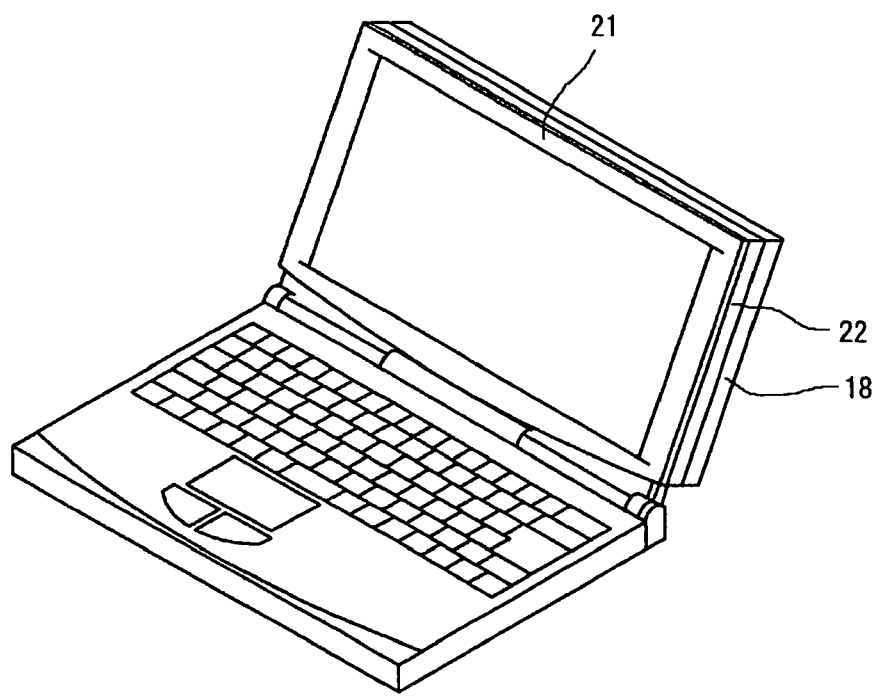
FIG. 5 is a perspective view schematically showing an appearance of a notebook-type personal computer provided with a water-retaining member together with a water-absorbing member.

FIG. 5 is a schematic drawing of an exemplary notebook-type personal computer provided with the water-retaining member capable of temporarily accumulate the water in cooperation with the water-absorbing member. In this case, the water-retaining member 22 is provided between the back surface of the display of the notebook-type personal computer 21 and the water-absorbing member 18. The water-retaining member 22 herein may be provided over the entire back surface of the display, or in a part of the back surface of the display, typically in an outer circumferential area thereof. In the notebook-type personal computer 21, the water-retaining member 22 absorbs and accumulates the water from the water-absorbing member 18, and the water-absorbing member 18 again absorbs the accumulated water back from the water-retaining member 22, and the water is then allowed to evaporate from the water-absorbing member 18 or from the water-retaining member 22 to the air. The water-retaining member 22 is configured as being detachable from the notebook-type personal computer 21 and water-absorbing member 18, and can be replaced once the amount of absorbed water exceeds a predetermined level, or can be recycled after squeezing the water therefrom. For example, the water-retaining member 22 can be configured so as to be detachable together with the power generation apparatus 20 when the power generation apparatus 20 is attached/detached to/from the notebook-type personal computer 21, and so as to be attached/detached together therewith when, for example, a hydrogen occlusion cartridge for supplying a fuel to the power generation apparatus 20 is exchanged.

The water produced by the power generator 10 of the power generation apparatus 20 is recovered by the water-absorbing member 18, then moved over the entire region of the water-absorbing member 18, absorbed by the water-retaining member 22 and temporarily be accumulated by the water-retaining member 22. The water-retaining member 22 is constituted by a material capable of absorbing and retaining the water similarly to the case of the water-absorbing member 18, and examples of which include porous metals or porous minerals, hydrophilic carbon, and polymers, all of which having a recessed portion on the surface thereof.

When a migration material composed of yarn materials having the micro-void regions formed therein as viewed in the cross section across the longitudinal direction thereof are used as the water-retaining member 22, similarly to the case of the water-absorbing member 18, the water moved by the water-absorbing member 18 is sucked up by the water-retaining member 22 with the aid of the capillary phenomenon, and is accumulated therein. The suction force herein becomes larger as the sectional area of the water path through which the water is sucked up with the aid of the capillary phenomenon decreases, so that the water-retaining member 22 will have a higher water absorbency and will more readily suck up the water, as the sectional area of the micro-void regions as viewed in the cross section across the longitudinal direction thereof becomes smaller.

As described in the above, for the case where the water-absorbing member 18 is provided to the power generation apparatus 20 so as to recover and move the water produced during the power generation, and the water is temporarily accumulated in the water-retaining member 22, the water-retaining member 22 is provided in contact with the water-absorbing member 18, whereas for the case where the water-absorbing member 18 recovers and moves the water produced during the power generation by the power generator 10 and then allows the water to evaporate, the water can temporarily be accumulated only when the amount of evaporation from the water-absorbing member 18 is smaller than the amount of water recovered by the water-absorbing member 18. The power generation apparatus 20 can, therefore, control the amount of water possibly be recovered by the water-absorbing member 18 through adjustment of the capacity and mass of the water-retaining member 22, and this makes it possible to realize power generation optimized based on external environments and output, in a manner less likely to be affected by the external environments such as humidity, temperature and air flow.

The present inventors made following experiments on thus-configured power generation apparatus 20.

First, the fuel cell as the power generator was fabricated as described below. In order to form the hydrogen-side catalyst layer and oxygen-side catalyst layer of the power generator, "platinum-carried carbon (amount of carry=46.7 wt %)" manufactured by Tanaka Kikinzoku Group and "solid polymer electrolyte solution (Nafion (registered trademark) solution)" manufacture by Du Pont Kabushiki Kaisha were mixed using so-called NPA and water, and stirred for two hours in a polyethylene container adding metal balls so as to improve the dispersibility. The mixture was then coated on a polytetrafluoroethylene sheet so as to adjust the platinum carried density to 0.22 mg/cm$^2$ and dried, to thereby form the hydrogen-side catalyst layer and oxygen-side catalyst layer. After the hydrogen-side catalyst layer and oxygen-side catalyst layer were formed, these catalyst layers were thermally transferred on both surfaces of an electrolyte film (trade name: Nafion (registered trademark) 112) composed of a solid polymer film. In order to further form the hydrogen-side diffusion layer and oxygen-side diffusion layer respectively on the hydrogen-side catalyst layer and oxygen-side catalyst layer, thus formed one was sandwiched by "carbon cloth CARBEL (registered trademark)" manufactured by Japan Gore-Tex Inc., and again bonded by heat pressing, to thereby fabricate a film-electrode bonded component which serves as the power generator.

The power generator composed of the film-electrode bonded component was then held by a metal structure which includes a gold-plated hydrogen-side current collector and oxygen-side current collector to thereby fabricate a fuel cell, and voltage characteristics of the fuel cell were confirmed. The experiment was carried out under an indoor environment conditioned at a temperature of 22° C. to 23° C., and a relative humidity of 30% to 40%. The anode side is fueled with hydrogen gas, and the cathode side is supplied with air through an opening provided as an air intake port in a portion of the metal structure in contact with the oxygen-side diffusion layer. As the water-absorbing member, cloth made of a high-water-absorption, high-moisture-releasing fabric "Belima (registered trademark) X" manufactured by Kanebo Gohsen, Ltd. was used, and arranged on the circumferential portion, and in particular in the vicinity, of the opening portion. As a comparative example, similar experiment was made on a case where the water-absorbing member was not arranged.

Figure 6:
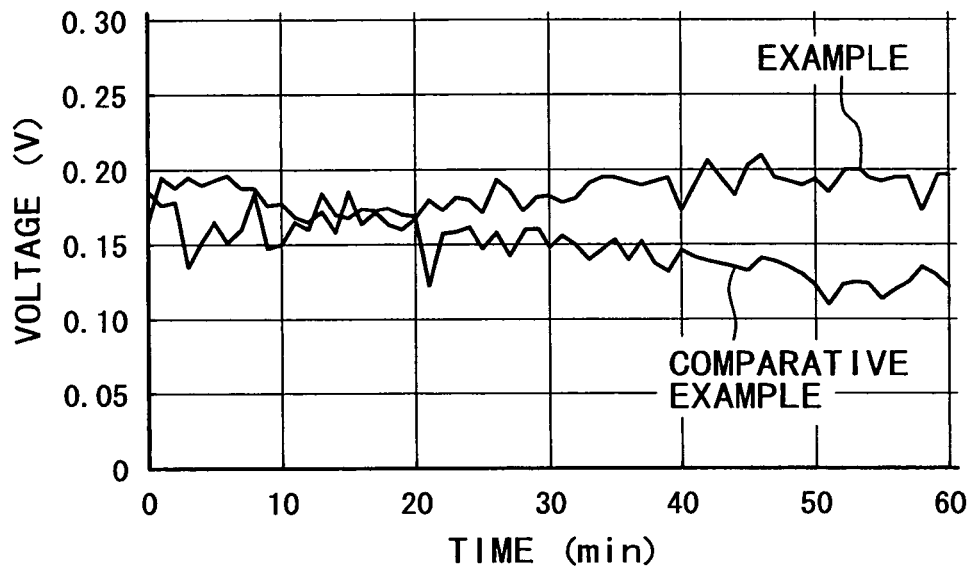
FIG. 6 is a drawing for explaining results of experiments for verifying effect of a power generator provided with the water-absorbing member, showing relations between output voltage of the power generator and time elapsed from the start of power generation.

Experimental results on these power generators were shown in FIG. 6. The drawing shows a time-series chart obtained by measuring 1.5-A constant current characteristics of voltage generated by the power generator, wherein the ordinate plots output voltage from the power generator, expressed in volt (V), and the abscissa plots time elapsed, expressed in minute.

As shown in the drawing, the comparative example having no water-absorbing member arranged therein was found to gradually decrease the output with elapse of time, whereas the embodiment having the water-absorbing member arranged therein was found to be stable in the output irrespective of time elapsed. It was also found from visual observation that the comparative example was found to have the water, produced by the power generation, as being accumulated in a form of water droplets at the opening portion, which is an air intake port, whereas no accumulation of the water droplets was observed for the case having the water-absorbing member arranged therein. This is an effect of the arrangement of the water-absorbing member in the vicinity of the opening portion formed in a part of the metal structure on the cathode side, and none other than because a stable air intake through the opening was ensured by recovery and moving of the water by the water-absorbing member. As described in the above, it was found that the water recovered by the water-absorbing member is allowed to vaporize from the water-absorbing member into the air, and this made it possible to ensure stable recovery of the water over a long duration of time, and to further ensure stable air intake for the fuel cell.

As is known from the above, in the power generation apparatus 20, the water produced in the power generator 10 is absorbed and moved by the water-absorbing member 18, and is disposed by the water-absorbing member 18 through evaporation into the air. In the power generation apparatus 20, the water produced in the power generator 10 can, therefore, be disposed without allowing it to stagnate inside the power generation apparatus 20, and can be discharged out from the oxygen-side diffusion layer 16. In the power generation apparatus 20, it is also made possible to avoid interference on supply of a substance mainly containing hydrogen, such as hydrogen gas, to the hydrogen-side catalyst layer 13 due to back diffusion of water through the electrolyte film 14 to the anode. Also with respect to the cathode of the power generation apparatus 20, the produced water does not clog the opening portion 17a of the oxygen-side current collector 17, and this is successful in avoiding interference on the air supply to the oxygen-side diffusion layer 16, and makes it possible to keep on generating power without lowering performance of the power generator 10.

In the power generation apparatus 20, the water-absorbing member 18 recovers and moves the water with the aid of the capillary phenomenon, so that a simple adjustment of the capacity or mass of the water-absorbing member 18, while leaving the water-absorbing performance unchanged, makes it possible to regulate the water content of the water and amount of evaporation of the water, and this makes it possible to realize power generation optimized based on external environments and output, in a manner less likely to be affected by the external environments such as humidity, temperature and air flow. It is further necessary for the anode of the power generation apparatus 20 to have an appropriate amount of water in order to allow migration of proton in the electrolyte, wherein it is possible in the power generation apparatus 20 to regulate the water content of the water and amount of evaporation of the water by modifying the capacity or mass of the water-absorbing member 18, and the adjustment of the amount of absorption of the water of the water-absorbing member 18 makes it possible to control the water content used for moistening the hydrogen-side diffusion layer 12.

Because the water-absorbing member 18 is a high-water-absorption, high-moisture-releasing material making use of the capillary phenomenon, it can completely recover the water and can dispose it through evaporation into the air, even in a flat-type, small-sized power generation apparatus having the cathode often configured as of open-air-type, without newly adding a device for controlling pressure or flow rate of the gas. Furthermore, disposal of the water by the water-absorbing member 18 means that the water possibly being scattered around the devices can be disposed, and thereby malfunctions of the devices become avoidable.

The water-absorbing member 18 sucks up the water with the aid of the capillary phenomenon and allows it to evaporate into the air, unlike a method of blowing water droplets using an external device or naturally-occurred air flow, or a method of discharging the water droplets to the external making use of its self weight, so that it is made possible to recover the water and to allow it to evaporate into the air irrespective of orientation of the apparatus with respect to the air flow or gravity. The power generation apparatus 20 can, therefore, not only prevent performance of the fuel cell incorporated in the electronic devices from degrading, without causing scattering of the water in unintended places or inside the devices, but can also allow the water to evaporate out from the devices into the air in simple and exact manners.

The water produced by the cathode of the power generation apparatus 20 is recovered by the water-absorbing member 18 and evaporated from the water-absorbing member 18, wherein the evaporation from the water-absorbing member 18 into the air occurs every time the water is recovered and mover by the water-absorbing member 18. Therefore, the water, which increases with elapse of time of power generation in small-sized devices, can be evaporated in simple and efficient manners, without recovering and accumulating the water at a certain place, without providing any additional function of generating energy. Even for flat-type or small-sized power generation apparatuses, which are difficult to afford a new place for accumulating the water, because the water-absorbing member 18 causes the evaporation into the air every time the water-absorbing member 18 recovers the water, it is not necessary to dispose the accumulated water in a periodical manner, and this makes it possible to readily and constantly dispose the water produced by the power generator 10.

The water-absorbing member 18 can also be increased in the area in contact with the air by modifying the shape thereof, and can consequently be increased in the amount of water which can efficiently be disposed through the evaporation.

Furthermore, in the power generation apparatus 20, it is also possible to temporarily accumulate the water by providing the water-retaining member 22 on the water-absorbing member 18 so as to contact therewith, even if the amount of evaporation from the water-absorbing member 18 is smaller than the amount of the water absorbable by the water-absorbing member 18. The power generation apparatus 20 can, therefore, control the amount of evaporation of water evaporated from the water-absorbing member 18 by providing the water-retaining member 22, and can readily control the water content in the power generation apparatus 20, and this makes it possible to realize power generation optimized based on external environments and output, in a manner less likely to be affected by the external environments such as humidity, temperature and air flow.

It is to be understood that the electronic device to which the water-absorbing member is applied is by no means limited to notebook-type personal computer. That is, examples of the devices on which the fuel cell or fuel cell card to which the water-absorbing member is applied can be mounted include not only notebook-type personal computer, but also portable printer and facsimile; peripheral devices for personal computer; telephone set; television set; communication equipment; portable terminal device; camera; audio component; video equipment; motor fan; refrigerator; pressing iron; thermos; vacuum cleaner; rice cooker; electromagnetic cooker; illuminator; toys such as game machine, radio-controlled car and so forth; power tool; medical appliance; measurement device; automotive equipment; office machine; health and beauty appliances electronic-controlled robot; and wearable electronic equipment, wherein any other applications are also allowable. In particular for the case where the fuel cell is desired to be mounted on portable and small-sized electronic devices, the present invention realizes it without adding any new devices for disposing the water.

Next paragraphs will describe a water disposal system exemplified as the second embodiment.

The second embodiment relates to a fuel cell as a power generation apparatus to which the water disposal system is applied. The fuel cell is configured by stacking a plurality of the power generator, so-called MEA, which has a predetermined electrolyte film provided between an anode and a cathode, wherein the MEA is held between thin-plate-formed separators having, as being formed on the front and back surfaces thereof, a hydrogen supply groove as a fuel supply groove for supplying hydrogen to the anode, and an air supply groove as an oxidizer supply groove for supplying air to the cathode, so as to produce power generation by supplying hydrogen and air through the separators.

The fuel cell is specifically configured as having a means for disposing the water, provided at least on the midway portion of the air supply groove formed on the separator, to thereby make it possible to efficiently and completely dispose the water, with a simple configuration.

First, a configuration of the separators will be explained.

Figure 7:
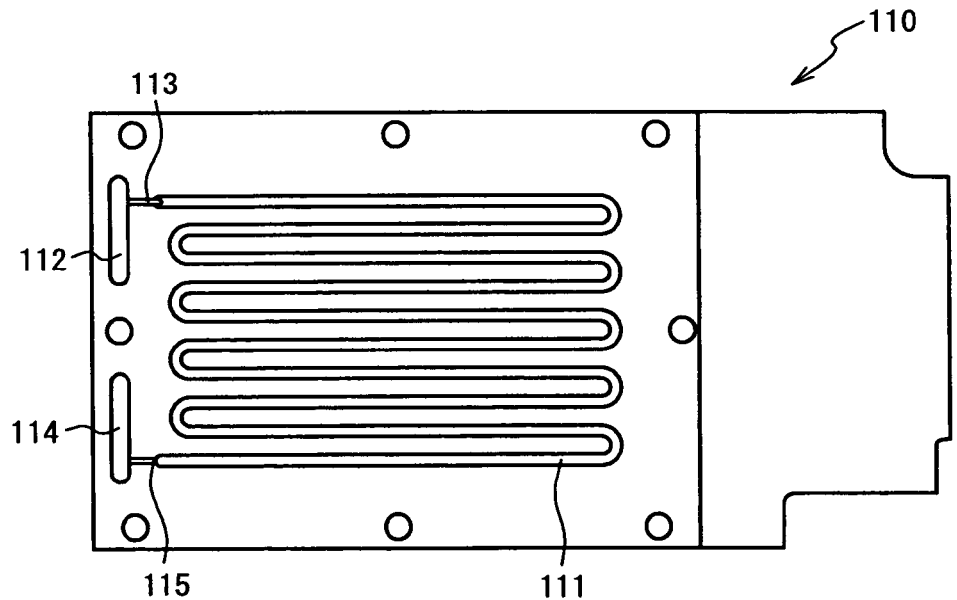
FIG. 7 is a plan view of a separator applicable to a fuel cell exemplified as a second embodiment of the present invention, as viewed from the front surface.

FIG. 7 shows a plan view of a separator 110 of the fuel cell as viewed from the front surface. The separator 110 has a hydrogen supply groove 111 for supplying hydrogen to the unillustrated anode, as being formed on the surface thereof.

The hydrogen supply groove 111 is provided for allowing hydrogen to flow in the plane of separator 110, and is configured so as to be integrated with a supply port 112, which is connected to an unillustrated hydrogen supply unit for supplying hydrogen gas, through a connection portion 113, and also so as to be integrated with an exhaust port 114 for exhausting the hydrogen gas through a connection portion 115. For the purpose of downsizing together with an improved power generation efficiency, the hydrogen supply groove 111 is formed as a single groove snaking from the connection portion 113 in connection with the supply port 112 towards the connection portion 115 in connection with the exhaust port 114. The supply port 112 and exhaust port 114 herein are connected between the individual separators which, as described later, are to be stacked when a stacked structure is formed as the power generator, to thereby form a supply route of hydrogen gas to the individual separators 110.

Figure 8:
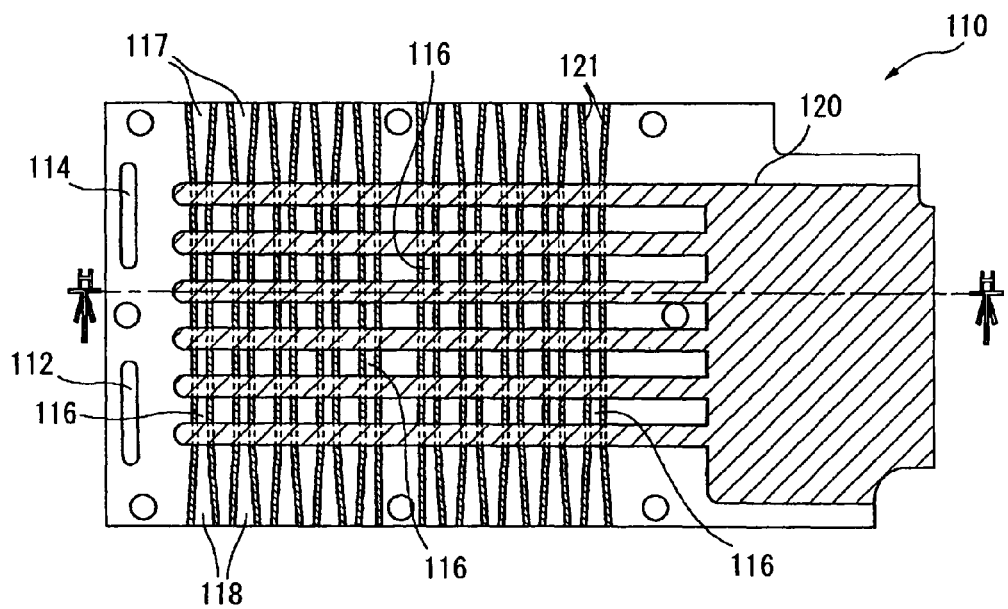
FIG. 8 is a bottom view of the same separator as view from the back surface.

In a bottom view as viewed from the back surface of the separator 110 shown in FIG. 8, air supply grooves 116 for supplying air to the unillustrated cathode is formed.

Each air supply groove 116 is provided for allowing the oxygen-containing air to flow in the plane of the separator 110, and is formed so as to extend thereon, and opened at both edge portions in the width-wise direction of the separator 10, which is expressed as the vertical direction in the drawing. On the separator 110, a plurality of thus-configured air supply grooves 116 are formed so as to be aligned in the longitudinal direction thereof, which is expressed as the lateral direction in the drawing. The drawing shows an exemplary case having ten air supply grooves 116 formed thereon. The air supply groove 116 is supplied with air through a supply port 117 which opens on one side edge portion towards the unillustrated air supply unit for supplying the air, and exhausts the air through a exhaust port 118 opened on the side edge opposite to the supply port 117. The supply port 117 and exhaust port 118 herein are formed so as to have sectional areas larger than that of the air supply groove 116, and so as to be reduced as tapered in the sectional area in the depth-wise direction of the air supply groove 116, which is expressed as the vertical direction in the drawing. This makes it possible for the separator 110 to reduce resistance in the flow path during intake of the air into the air supply groove 116 and during exhaust of the air from the air supply groove 116, and allows smooth supply and exhaust of the air.

Figure 9:
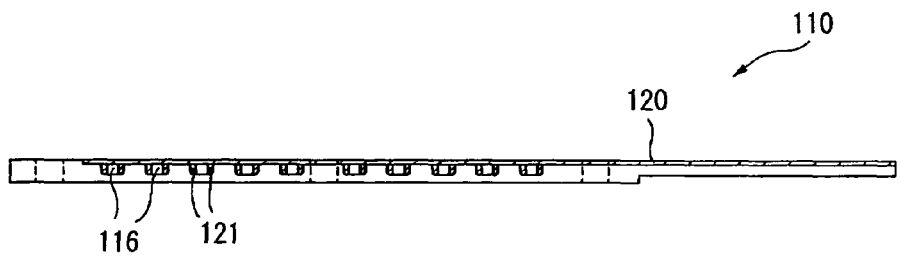
FIG. 9 is a sectional view of the same separator taken along the line H-H indicated by the dashed line in FIG. 8.

The separator 110 is further provided with a water-absorbing cloth 120 as a water-absorbing member for absorbing the water, which covers at least a portion of the surface having the air supply grooves 116 formed thereon, as indicated by the hatched area in the drawing. The water-absorbing cloth 120 is formed so that a plurality of band-formed regions are extended from a surface having no air supply grooves 116 formed therein but having a radiating fin with a predetermined area formed therein, which is indicated on the right-hand side of the drawing, so as to have a strip form, wherein the strip-formed regions are arranged so as to cover at least a part of the air supply grooves 116. The separator 110 is also provided with a water-absorbing cloth 121 as a water-absorbing member along the sidewalls of the air supply grooves 116, as shown in FIG. 9, which is a sectional view taken along the line H-H indicated by a dashed line in FIG. 8.

Any materials having water absorbency are applicable to the water-absorbing cloths 120, 121.

More specifically, it is preferable to use hydrophilic water-absorbing materials for the water-absorbing cloths 120, 121, and similarly to the water-absorbing member 18 described above, examples of applicable polymer materials include those of crosslinked polyacrylic acid salt base, isobutylene/maleic acid salt base, starch/polyacrylic acid salt base, PVA/polyacryl base, acryl fiber hydrolyzate base, and crosslinked PVA base. The water-absorbing cloths 120, 121 are preferably such as being capable of moving the water to a predetermined distant place and allowing it to evaporate as described later, and are preferably a material also capable of moving the water. Examples of this sort of material include, as described in the above, porous metals or porous minerals, hydrophilic carbon, paper, pulp, polymer materials, natural fibers and synthetic fibers, all of which having a recessed portion on the surface thereof. Other known examples of this sort of material are those having a high water absorbency based on the capillary phenomenon, wherein examples of which include polyester/nylon composite material and polyester, which are synthetic fibers in which yarn materials having micro-void regions formed therein as viewed in the cross section across the longitudinal direction thereof are woven lengthwise and crosswise.

The water-absorbing cloths 120, 121 may be composed of various materials having these characteristics.

Taking now these characteristics required for the water-absorbing cloths 120, 121 into consideration, those shown in the next are proposed as the water-absorbing cloths 120, 121.

Figure 10:
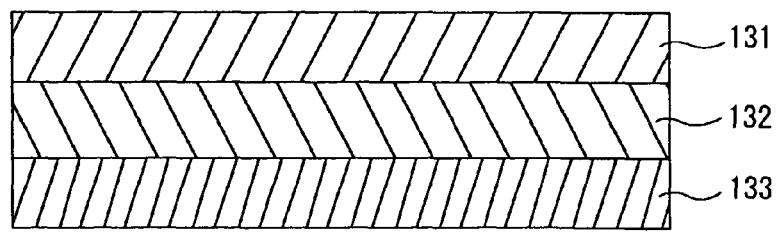
FIG. 10 is a sectional view for explaining a three-layered structure of a water-absorbing cloth.

As the water-absorbing cloth, as shown in FIG. 10, it is proposed a three-layered structure in which a cloth material including a double-layered structure, having a first material 131 excellent in moisture-absorbing/releasing property and a second material 132 excellent in water absorbency are bonded, is further bonded with a tape material 133, such as an adhesive tape, on the lower surface of the second material 132.

The first material 131 is composed of a material excellent in moisture-absorbing/releasing property, wherein an applicable material is exemplified by "HYGRA (registered trademark)" manufactured by Unitika Fibers, Ltd., which makes possible to control the moisture-absorbing/releasing property by adopting a core/sheath composite structure in which a water-absorbing polymer is covered with nylon. HYGRA (registered trademark), if adapted to clothes and so forth, can absorb or release moisture depending on difference in vapor pressure inside the clothes and in the outer air. Thus-configured first material 131 composes the topmost layer of the water-absorbing cloth having the three-layered structure, absorbs the water absorbed by the second material 132, and releases it into the outer air.

The second material 132 is composed of a material excellent in water absorbency, wherein an applicable material is exemplified by "LUMIACE (registered trademark)" manufactured by Unitika Fibers, Ltd., which exhibits its high water absorbency through the above-described capillary phenomenon. LUMIACE (registered trademark) is an aggregate of fibers having irregular sectional shapes and different fineness, wherein each fiber has an extremely larger number of contact points as compared with the ordinary round-sectioned fiber, and has contact surfaces not found in the ordinary round-sectioned fiber. LUMIACE (registered trademark) can exhibit an excellent water absorbency because these contact points and contact surfaces reside therein form micro-void regions in the longitudinal direction, and water entered therein will raise its pressure due to surface tension to thereby effect the capillary phenomenon. Thus-configured second material 132 composes an intermediate layer of the water-absorbing cloth having the three-layered structure, sucks the water through the tape material 133, and releases it to the first material 131.

The cloth having the double-layered structure in which the first material 131 and second material 132 are bonded can be available also in the commercial products such as "HYGRA-LU" manufactured by Unitika Fibers, Ltd., and this sort of material can be used for the water-absorbing cloth.

The tape material 133 is composed of a resin-base material having adhesion property, and is provided for adhering the water-absorbing cloth to the separator 110. It is therefore preferable that the tape material 133 is less likely to be degraded in the adhesiveness due to water, wherein an applicable material is exemplified by "polyester-base, double-face tape 442JS" manufactured by Sumitomo 3M, Ltd. The polyester-base, double-face tape 442JS is a so-called, double-face tape including a polyester base coated, on both surfaces of which, with a rubber-base adhesive material excellent in alkali-resistant property, and can exhibit an excellent initial adhesive force on various materials to be adhered, and is less likely to leave the adhesive after peeling. Thus-configured tape material 133 composes the lowermost layer of the water-absorbing cloth having the three-layered structure, bonded to the separator 110, and allows the water to be sucked up by the second material 132 with the aid of its absorbing power to pass towards the second material 132.

The separator 110 is thus made possible to absorb the water in extremely efficient and reliable manners, by using thus-configured material having the three-layered structure and having a high water absorbency based on the capillary phenomenon.

Figure 11:
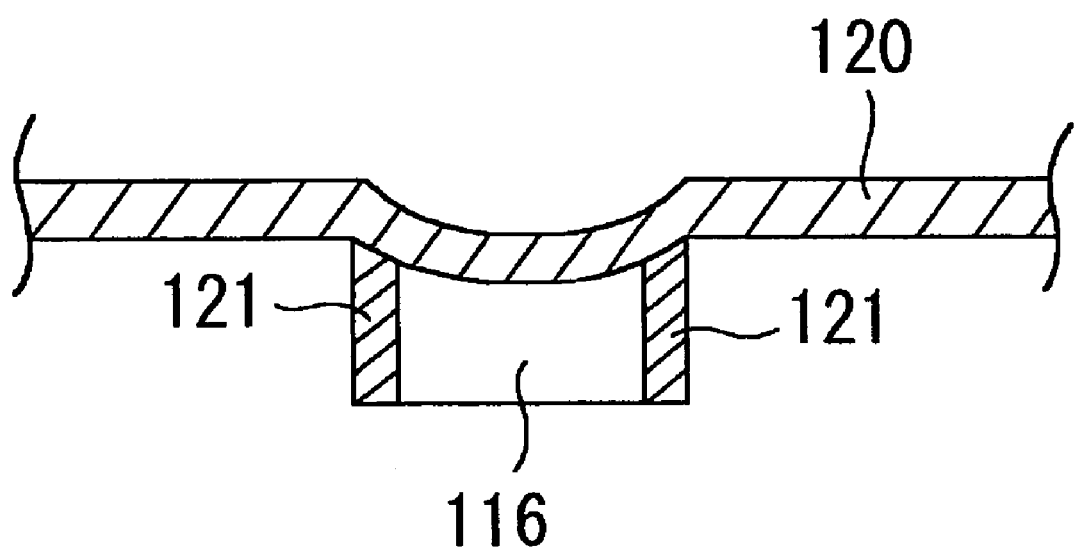
FIG. 11 is a sectional view showing a partial region of a separator used as a water-absorbing cloth without being provided with a tape material, explaining a sagged state thereof in a portion covering an air supply groove.

By using thus-configured, water-absorbing cloths 120, 121 having the tape material 133 provided on the lowermost side thereof, the separator 110 is successful in avoiding fear of unnecessary clogging of the air supply grooves 116. Because the cloth material having water absorbency is very flexible, use of this material directly as the water-absorbing cloth 120, without being lined with the tape material 113, may cause sagging of the material in the portion covering the air supply groove 116, as shown in FIG. 11 showing a partial region of the section of the separator 110, and therefore may make it difficult to stabilize the shape. On the contrary, the tape material 133 has a rigidity enough to stabilize the shape despite of its flexibility, so that it can stabilize the shape of the water-absorbing cloth 120, and can avoid the fear of unnecessary clogging of the air supply grooves 116 due to the sagging.

By using thus-configured, water-absorbing cloths 120, 121 having the tape material 133 provided on the lowermost side thereof in the separator 110, it is also made possible to readily handle the water-absorbing cloths 120, 121 when they are arbitrarily cut and then shaped. More specifically, in fabrication of the separator 110 in which the water-absorbing cloths 120, 121 are formed into the above-described strip form, it is necessary to cut a commercially available cloth material or the like, wherein the cloth material tends to be frayed on the cut edge thereof and is difficult to be cut in an arbitrary shape. Whereas the water-absorbing cloths 120, 121 provided with the tape material 133 so as to have the three-layered structure make it possible to readily realize processing which involves cutting.

In thus-configured separator 110, having the water-absorbing cloths 120, 121 provided on the midway portion of the air supply groove 116, the water produced during power generation by the power generator is absorbed.

More specifically, in the separator 110, the water stagnated in the air supply grooves 116 is absorbed by the water-absorbing cloth 121 provided along the sidewall of the air supply groove 116. In the separator 110, the water sucked by the water-absorbing cloth 121 is further sucked by the water-absorbing cloth 120 provided so as to cover at least a part of the air supply grooves 116, and moved through the water-absorbing cloth 120 towards the region on the right hand side of the drawing, having the radiating fin formed therein. In the separator 110, the water moved to the radiating fin is allowed to evaporate at the radiating fin with the aid of heat and air flow.

As described in the above, because the water-absorbing cloths 120, 121 are provided on the midway portion of the air supply grooves 116 and thereby the water produced during power generation by the power generator is absorbed therein, the separator 110 can avoid clogging of the air supply grooves 116 due to the water, can avoid interference on the air flow through the air supply grooves 116, and can thereby stabilize the power generation efficiency.

The present inventors made comparative experiments in order to practically verify the effects of the actual separator 110 provided with the water-absorbing cloth 120, 121.

The experiments were carried out under an environment conditioned at a temperature of 25° C. and a relative humidity of 100%, which is highly causative of dewing, based on measurement under a constant current of 157 mA/cm$^2$ supplied to the MEA, in order to compare the cases with and without water-absorbing cloths 120, 121. The MEA used for the experiments herein are such as using so-called perfluorocarbon sulfonic acid as a conductor. The water-absorbing cloths 120, 121 used herein are materials having a three-layered structure in which the above-described "HYGRA-LU" manufactured by Unitika Fibers, Ltd. and "polyester-base, double-face tape 442JS" manufactured by Sumitomo 3M, Ltd. are bonded. This material is preliminarily confirmed on its water absorbency by Byreck method, one of water absorbency testing methods for fabric products specified in JIS (Japan Industrial Standards), by which a test strip is perpendicularly hung so as to immerse the lower end thereof into water, allowed to stand for a predetermined period of time, and water-absorbing rate is expressed by height of water arisen therein.

Figure 12:
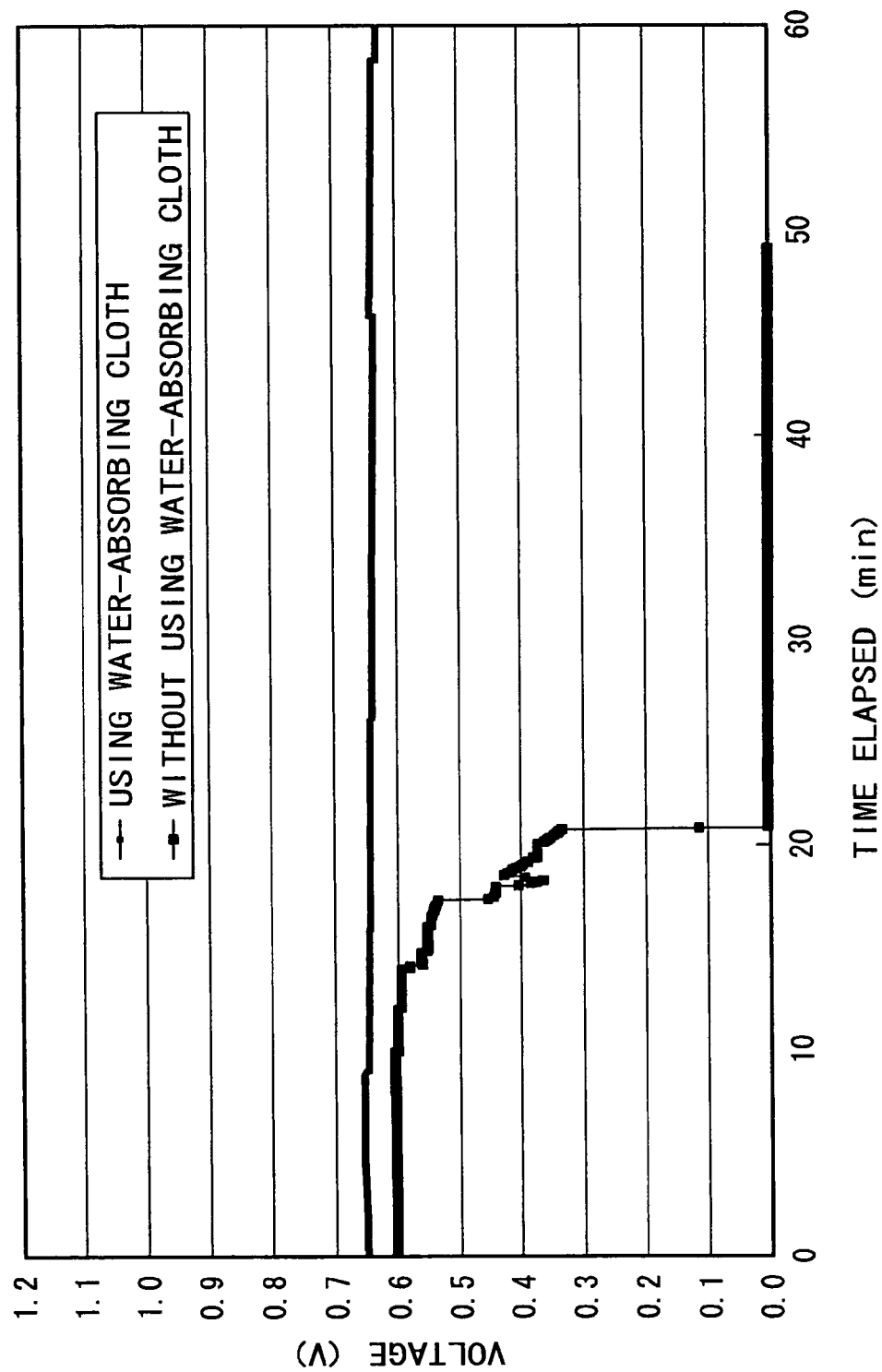
FIG. 12 is a drawing for explaining results of experiments for verifying effect of a separator provided with the water-absorbing cloth shown in FIG. 10, showing relations between output voltage of a power generator and time elapsed from the start of power generation.

The experiments gave results as shown in FIG. 12. In this drawing, the ordinate plots output voltage from the power generator, expressed in volt (V), and the abscissa plots time elapsed, expressed in minute.

The drawing illustrates that the case without using the water-absorbing cloths 120, 121 results in voltage drop as early as 20 minutes after the start of power generation due to the suffocation phenomenon of the air supply groove 116, whereas the case using the water-absorbing cloths 120, 121 shows a stable output even one hour after the start of power generation.

As described above, the separator 110, having the water-absorbing cloths 120, 121 on the midway portion of the air supply grooves 116 makes it possible to dispose the water in efficient and reliable manners under a simple configuration without using at all any complicated mechanism such as a pump or flow path newly formed for water removal, and makes it possible to stabilize the power generation efficiency.

The separator 110 also makes it possible to raise evaporation rate, or water disposal rate, because the water trapped by the water-absorbing cloths 120, 121 is diffused over the entire region of the water-absorbing cloths 120, 121.

In general, water is likely to evaporate when the external environment has a low humidity, whereas less likely to evaporate when the external environment has a high humidity. In short, evaporation rate of water varies depending on environmental humidity. On the contrary, in the separator 110, the water-absorbing cloths 120, 121 also play a role of buffer for retaining the water, and can temporarily hold the water when humidity in the external environment is high.

By using the material having the three-layered structure which exhibits water absorbency with the aid of the capillary phenomenon as the water-absorbing cloths 120, 121, it is also made possible for the separator 110 to move the water towards the radiating fin arranged away from the power generator with the aid of the capillary phenomenon, without using any external means but only by forming the water-absorbing cloths 120, 121 in a long shape, and to allow the water to evaporate at the radiating fin with the aid of heat, air flow or the like. The separator 110 is thus successful in raising the water disposal rate, and in stabilizing the output during the power generation, even under a usual environment having a high relative humidity.

There is a fear for the separator 110 that provision of the water-absorbing cloth 121 along the sidewall of the air supply groove 116 may narrow the air path, and may adversely affect the air flow. The most critical cause for interference of the air flow is, however, the suffocation due to stagnation of the water, so that there is no practical adverse effect caused by the provision of the water-absorbing cloth 121 along the sidewall of the air supply groove 116. The fact is previously confirmed through experiments by the present applicant.

The following paragraphs will describe a specific example of the fuel cell provided with thus-composed separator 110.

Figure 13:
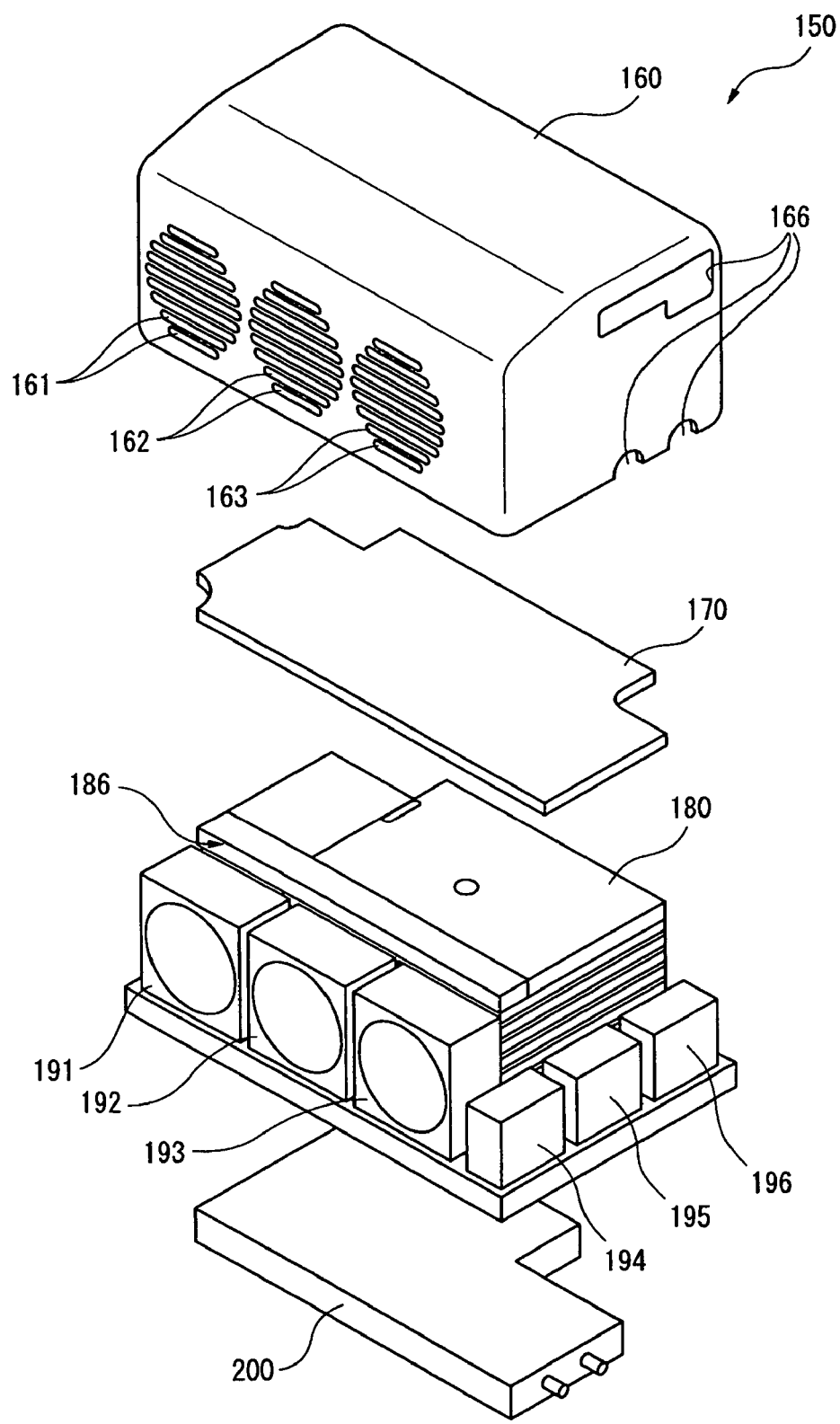
FIG. 13 is an exploded perspective view showing a configuration of a fuel cell using the same separator.

As shown in FIG. 13, a fuel cell 150 has an housing 160, a control board 170 having various circuits necessary for operating the fuel cell 150 formed thereon, a power generation section 180 configured by using the separator 110, a cooling fan 191 for cooling the power generation section 180, two air supply fans 192, 193 for supplying the air to the power generation section 180, corresponding to the above-described air supply unit, a hydrogen purge valve 194 for discharging the water stagnated in the hydrogen supply groove 111, a regulator 195 for controlling hydrogen gas pressure, and a hand valve 196 for supplying hydrogen gas to the power generation section 180; and further has, although not illustrated, sensors for sensing temperature, humidity, pressure and so forth of the air taken from the external or the air exhausted from the internal of the fuel cell 150, and a sensor for sensing temperature of the power generation section 180 as being provided depending on needs.

The fuel cell 150 is attached with a hydrogen occlusion cartridge 200 having hydrogen gas occluded therein. The fuel cell 150 receives the hydrogen gas supplied from the hydrogen occlusion cartridge 200 and generates electricity. That is, the hydrogen occlusion cartridge 200 corresponds to the above-described hydrogen supply unit for supplying hydrogen gas.

The housing 160 shows an appearance nearly equivalent to a rectangular parallelepiped as shown in FIG. 13 and FIG. 14, and is configured as having a hollow space inside thereof so as to cover the various components mounted on the fuel cell 150, and as being opened on the bottom surface thereof. The housing 160 has an inclined surface on one side face side of the top surface thereof, inclined towards the side face.

The housing 160 has three exhaust ports 161, 162, 163 and two air intake ports 164, 165 formed therein.

The exhaust ports 161, 162, 163 are, as shown in FIG. 14A, formed so as to be adjacent with each other on the first side face of the housing 160. From these exhaust ports 161, 162, 163, the air passed inside the fuel cell in order to cool the power generation section 180 and the air after the power generation reaction by the power generation section 180 are respectively exhausted.

More specifically, the exhaust port 161 is formed on the first side face of the housing 160 so that a plurality of holes opened in a nearly-slit form are arranged in the vertical direction of the side face, and that these holes are gradually shortened in size towards the upper and lower directions on the first side face. The exhaust port 161 is provided as an exit of the air used for heat dissipation at the radiating fin, described later, and exhausted from the fuel cell 150. Also the exhaust ports 162, 163 are respectively formed on the first side face of the housing 160 similarly to the exhaust port 161, so that a plurality of holes opened in a nearly-slit form are arranged in the vertical direction of the side face, and that these holes are gradually shortened in size towards the upper and lower directions on one side face. The exhaust ports 162, 163 are respectively provided as exits of the air which is supplied to the power generation section 180 for power generation by the power generation section 180.

The air intake ports 164, 165 are, as shown in FIG. 14B, formed so as to be adjacent with each other on the other side face of the housing 160, opposite to one side face having the exhaust ports 161, 162, 163 formed thereon. Through these air intake ports 164, 165, air for cooling the power generation section 180 and air containing oxygen to be consumed in the power generation reaction by the power generation section 180 are respectively incorporated into the fuel cell 150. More specifically, the air intake port 164 is formed on the other side face of the housing 160 so that a plurality of holes opened in a nearly-slit form are arranged in the vertical direction of one side face, and that these holes are gradually shortened in size towards the upper and lower directions on one side face. The air intake port 164 is provided as an air intake port through which the air used for heat dissipation at the radiating fin, described later, is incorporated into the fuel cell 150. Also the air intake port 165 is formed on the other side face of the housing 160, similarly to the air intake port 164, so that a plurality of holes opened in a nearly-slit form are arranged in the vertical direction of one side face, and that these holes are gradually shortened in size towards the upper and lower directions on one side face. The air intake port 165 is provided as an intake port of air which is supplied to the power generation section 180 when generating power by the power generation section 180.

In addition as shown in FIG. 13, FIG. 14C and FIG. 14D, the housing 160 has, as being formed in one end face thereof, connection holes 166 through which wiring for sending/receiving various signals between the fuel cell 150 and the external, and also has, as being formed in the other end face thereof, a predetermined connection hole 167.

The control board 170 has, as being formed thereon, various circuits including control circuits for controlling the various components composing the fuel cell 150. The control board 170 is provided on the upper side of the power generation section 180. Although details of the control circuits formed on the control board 170 will not specifically be illustrated, those mountable thereon include control circuit for controlling operations of the cooling fan 191 and air supply fans 192, 193, control circuit for controlling open/close operation of the hydrogen purge valve 194, voltage conversion circuit such as DC/DC (direct current to direct current) converter for raising voltage output from the power generation section 180, and control circuit for issuing instructions on operations of various components by acquiring various environmental conditions such as temperature, humidity, and so forth detected by a sensor described later. It is to be noted herein that the control board 170 will be explained as being provided inside the fuel cell 150, wherein the control board 170 may be provided outside the fuel cell 150, and for example, may be owned by various electronic devices supplied with electric power for operation from the fuel cell 150.

Figure 15:
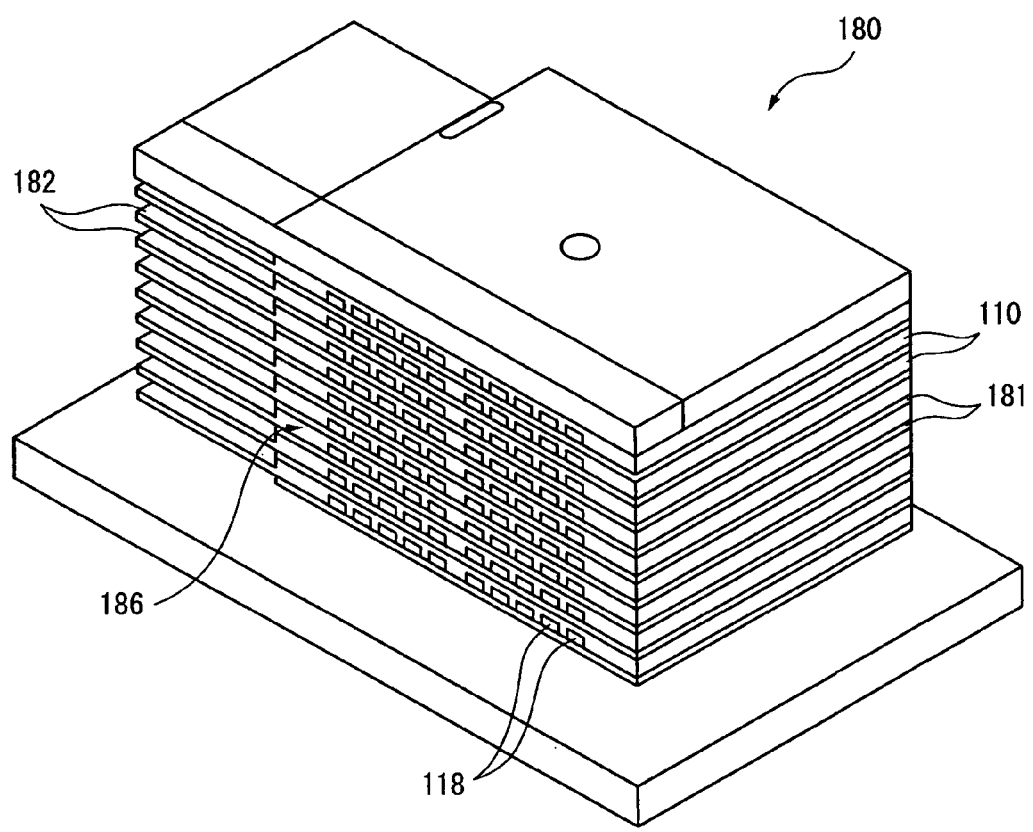
FIG. 15 is a perspective view showing a power generating section constituting the same fuel cell.

The power generation section 180 has an appearance nearly equivalent to a rectangular parallelepiped as shown in FIG. 13 and FIG. 15, and is configured as being notched along the vertical direction in a strip form at a portion of the side face 186 facing to the cooling fan 191 and air supply fans 192, 193.

More specifically, as shown in FIG. 15, the power generation section 180 is configured as having a bonded component 181 as the power generator between every adjacent ones of nine separators 110, so as to have a stacked structure in which eight unit elements for power generation are connected in series.

Figure 16:
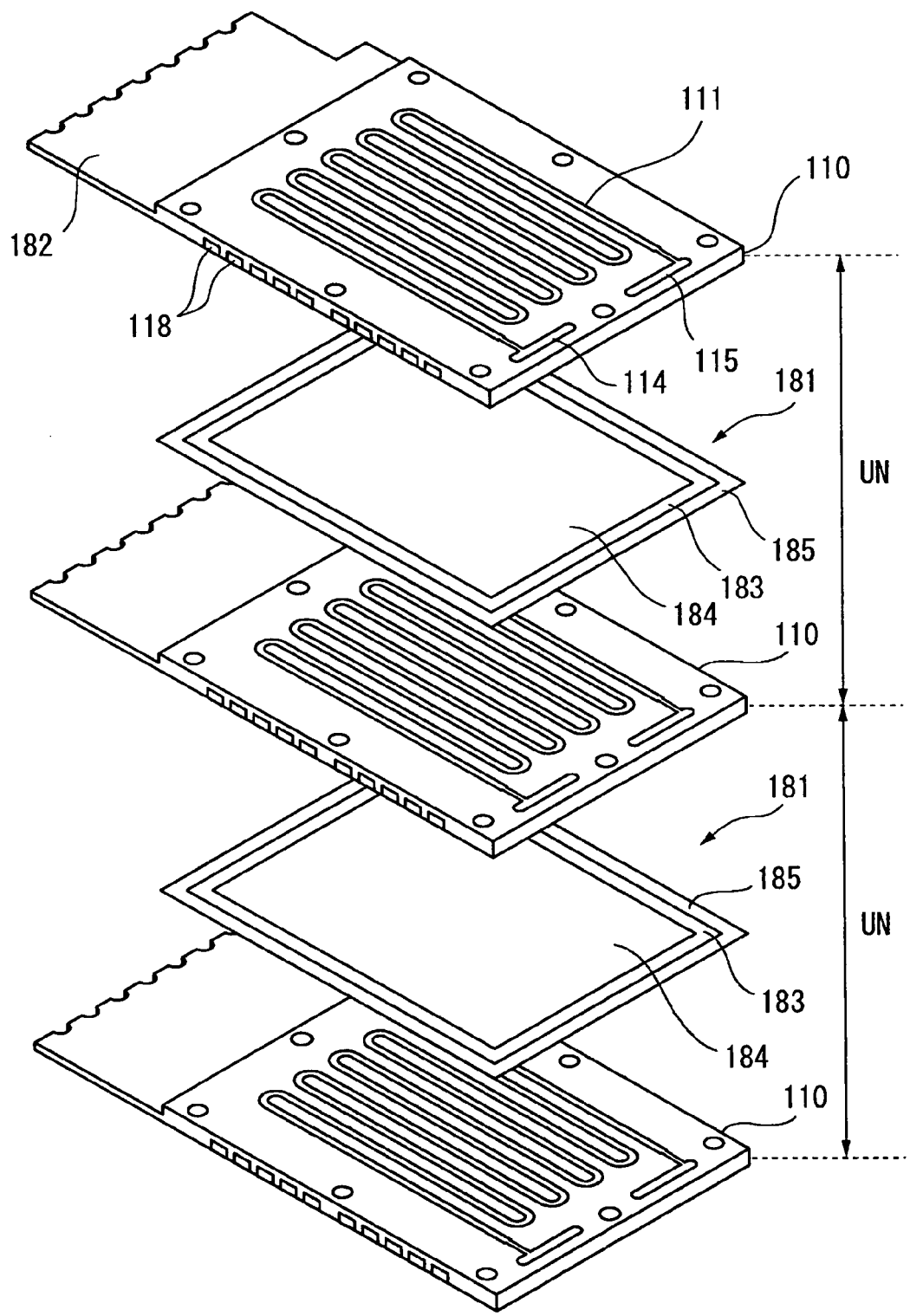
FIG. 16 is an exploded perspective view showing a part of the same power generating section.

As shown in FIG. 16, the unit element UN has two above-described separators 110, and a bonded component 181 held between two separators 110. It is to be noted that the figure shows two unit elements UN connected in series.

The separator 110 has a radiating fin 182 so as to be projected out from a surface having the hydrogen supply groove 111 and air supply grooves 116 formed thereon. In the separator 110, heat dissipation is effected through the radiating fin 182 by an action of the cooling fan 191 as described later. The separator 110 also has, as being formed on the back surface thereof, a plurality of air supply grooves 116. In the separator 110, as described later, air circulation inside the power generation section 180 is realized by air supply to the air supply grooves 116 by an action of the air supply fans 192, 193.

The bonded component 181 has a solid polymer electrolyte film 183 which exhibits ion conductivity under a moistened condition, and an electrode 184 holding the solid polymer electrolyte film 183 from both surfaces thereof. As the solid polymer electrolyte film 183, sulfonic-acid-base solid polymer electrolyte film can be used. As the electrode 184, an electrode immobilized with a catalyst for promoting the power generation reaction can be used.

In the vicinity of the circumference of the bonded component 181, a sealing member 185 is arranged for sealing a gap between the separator 110 and bonded component 181 formed when they are brought into a stacked structure as the power generation section 180. The sealing member 185 is composed of material capable of electrically isolating the circumferential portion of the separator 110 from the circumferential portion of the bonded component 181 to a desirable degree. It is also allowable to use a material having a large heat conductivity for the sealing member 185 in view of raising heat dissipating property, wherein an available example is Cho-Therm (product of Taiyo Wire Cloth Co., Ltd.), which is a material having sufficient levels of heat conductivity and electric insulation property.

Thus-configured unit element can output a voltage of approximately 0.6 V per element, so that the power generation section 180 shown in FIG. 15 having 8 unit elements connected in series can output a voltage of 4.8 V in total. The power generation section 180 has a current capacity of approximately 2 A. This allows the power generation section 180 to output current of 9.6 W on the ideal basis, but of approximately 6.7 W on the practical basis, which is approximately 70% of the ideal output, due to heat generation in the power generation reaction. The power generation section 180 can further be raised in the output by appropriately control water content in the water bonded component 181, or by realizing a smooth supply of hydrogen gas to the power generation section 180. The number of unit elements composing the power generation section 180 is by no means limited to eight, and may be a desired number considering output necessary for operating various electronic devices.

The power generation section 180 has a stacked structure in which the plurality of unit elements is connected in series. The power generation section 180 is therefore configured so that a plurality of the above-described exhaust ports 118 of the plurality of the air supply grooves 116 formed on each separator 110 are opposed to the side face 186, and so that a plurality of the above-described supply ports 117 of the plurality of air supply grooves 116 corresponding to the plurality of exhaust ports 118 are opposed to the side face opposite to the side face 186, although not shown.

Figure 17:
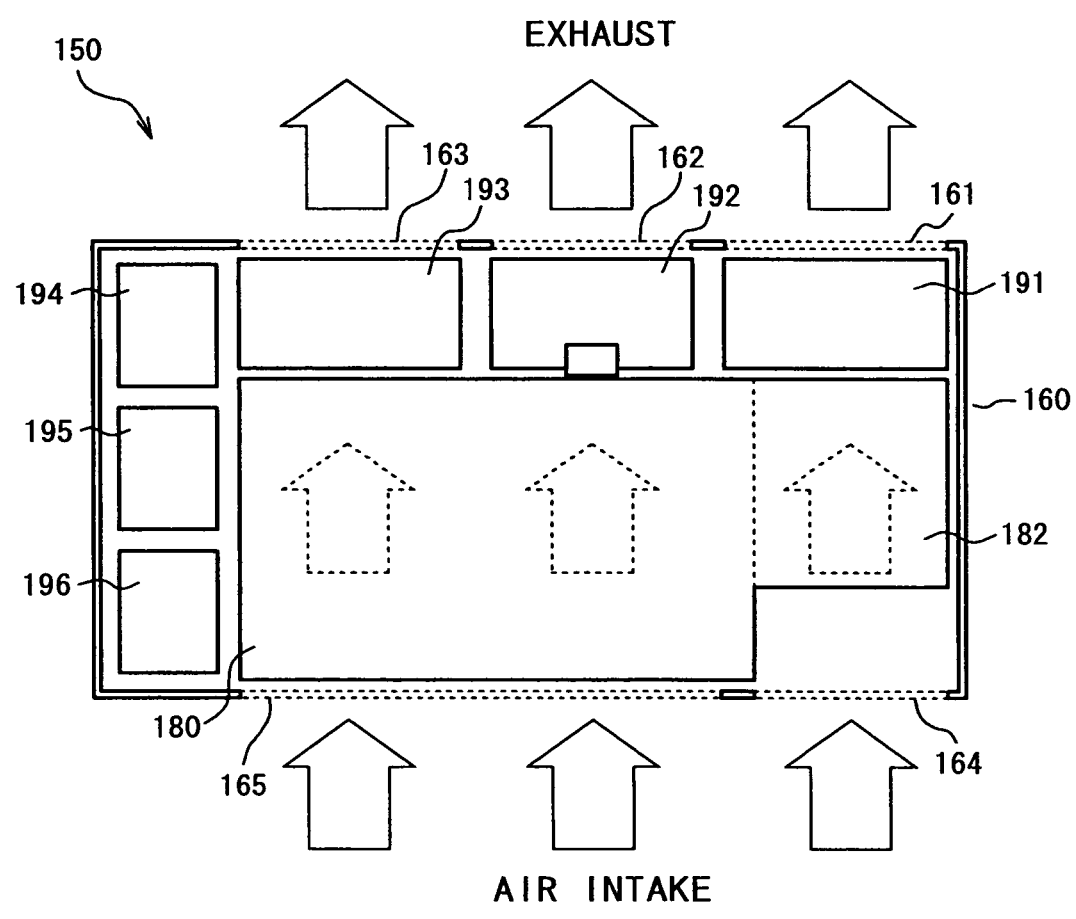
FIG. 17 is a plan view showing an internal configuration of the same fuel cell, and is a drawing for explaining the air flow.

The power generation section 180 is also provided with, as shown in FIG. 13, the cooling fan 191 and the air supply fans 192, 193 so as to be adjacent with each other along the side face 186. The power generation section 180 is still also provided with the hydrogen purge valve 194, the regulator 195 and the hand valve 196 so as to be adjacent with each other along the end face. The cooling fan 191 is provided between the exhaust port 161 formed in the housing 160 and the heat radiating fin 182 of the power generation section 180, along the side face 186, and cools the power generation section 180. More specifically, as shown in FIG. 17, the cooling fan 191 allows the air taken from the air intake port 164, which is formed in the housing 160, to flow towards the exhaust port 161 and exhausts it outward from the fuel cell 150.

As described in the above, the fuel cell 150 can perform heat dissipation of the power generation section 180 through the radiating fin 182 by circulating the air by the cooling fan 191 so as to pass through the radiating fin 182.

The position of placement of the cooling fan 191 is not limited to the place in the vicinity of the radiating fin 182, but may be a position capable of circulating the air over the entire portion inside the fuel cell 150 for the purpose of cooling the power generation section 180. In the fuel cell 150, it is also allowable to rotate the cooling fan 191 in the inverse direction so as to pass the air in an inverse direction.

The air supply fans 192, 193 are provided respectively between the exhaust port 162, 163 formed on the housing 160 and a region facing to the exhaust ports 118 of the air supply grooves 116 in the power generation section 180, along the side face 186, so as to supply air to the power generation section 180. More specifically, as shown in FIG. 17, the air supply fans 192, 193 individually allow the air taken through the air intake port 165 formed on the housing 160 to flow through the power generation section 180 towards the exhaust ports 162, 163, and exhaust the air outside the fuel cell 150.

As described in the above, by allowing the air supply fans 192, 193 to make flow of the air so as to pass through the power generation section 180, the fuel cell 150 can supply the air to the air supply grooves 116 formed on the separators 110 composing the power generation section 180.

In the fuel cell 150 herein, it is also allowable to make flow of the air in the inverse direction by respectively rotating the air supply fans 192, 193 in the inverse direction, similarly to the case for the cooling fan 191. The air flow formed respectively by the air supply fans 192, 193 may be independent from the air flow formed by the cooling fan 191. Therefore in the fuel cell 150, the independent operations of the cooling fan 191 and the air supply fans 192, 193 makes it possible to independently carry out cooling of the power generation section 180 and air supply/exhaust to or from the power generation section 180. In particular in the fuel cell 150, it is made possible to ensure a stable power generation without causing problems during the power generation such as dry-up, by measuring temperature of the power generation section 180 or residual water content in the power generation section 180, and by independently operating the air supply fans 192, 193 and the cooling fan 191 based on the results of the measurement.

The hydrogen purge valve 194 discharges the stagnated water by opening the hydrogen supply groove 111 formed on the separator 110 to the air. More specifically, in the fuel cell 150, opening of the hydrogen purge valve 194 so as to open the hydrogen supply groove 111 to the air results in causing difference between pressure of the hydrogen gas on the supply path side with respect to the stagnated water in the hydrogen supply groove 111 and pressure on the exhaust side opened to the air, and the stagnated water in the hydrogen supply groove 111 is discharged based on the pressure difference.

As described in the above, the fuel cell 150 can produce the pressure difference between the supply path side for supplying hydrogen gas and the exhaust side opened to the air through the hydrogen purge valve 194, and can discharge the water from the hydrogen supply groove 111 through which the hydrogen gas becomes difficult to flow as being affected by the stagnated water, even if the power generation section 180 has the stacked structure, and can thereby allow the hydrogen gas to smoothly flow through the hydrogen supply groove 111.

It is to be noted that the hydrogen purge valve 194 of the fuel cell 150 may be such as being operated based on an operational system using electromagnetic force, for example, or may be such as being supplied with electric power for operating the hydrogen purge valve 194 from the power generation section 180.

The regulator 195 controls pressure of the hydrogen gas supplied from the hydrogen occlusion cartridge 200, wherein the hydrogen gas is supplied to the power generation section 180 after being adjusted in the pressure to a predetermined pressure. In an exemplary case where pressure of the hydrogen gas supplied from the hydrogen occlusion cartridge 200 is adjusted to 0.8 MPa to 1.0 MPa or around, the regulator 195 reduces the pressure of the hydrogen gas to as low as 0.05 MPa to 0.10 MPa or around, and then supplies it to the power generation section 180.

The hand valve 196 is provided for the purpose of supplying hydrogen gas to the power generation section 180, and opens the flow path for supplying the hydrogen gas from the hydrogen occlusion cartridge 200 to the power generation section 180 when electricity is generated by power generation section 180.

In the fuel cell 150 having thus-configured components, by securing an area for arranging the cooling fan 191, air supply fans 192, 193, hydrogen purge valve 194, regulator 195 and hand valve 196 around the power generation section 180, it is made possible to enclose the various components for operating the fuel cell 150 inside the housing 160 in a compact manner, and to thereby realize a considerable degree of downsizing of the fuel cell 150.

The fuel cell 150 can, therefore, be used in an extremely desirable manner as a power source for supplying power for operating arbitrary electronic devices including portable electronic devices such as notebook-type personal computer, mobile phone and personal digital assistants (PDA).

By configuring the power generation section 180 using the separator 110 having the above-described, water-absorbing cloths 120, 121 provided thereon, it is also made possible for the fuel cell 150 to dispose the water in efficient and reliable manners under a simple configuration without using any complicated mechanism including a pump or newly-formed flow path, and thereby to stabilize the power generation efficiency.

Although the second embodiment was explained referring to the case where the water-absorbing cloth 121 was provided along both sidewalls of the air supply grooves 116 formed on the separator 110, the present invention may be adopted also to the case where the water-absorbing cloth 121 is provided along only one sidewall, or provided to at least a partial region of the sidewall, rather than over the entire region of the sidewall.

Although the second embodiment was explained referring to the case where the water-absorbing cloth 120 was formed so that a plurality of band-formed regions are extended from an area which serves as a radiating fin 182 so as to show a strip-like form as a whole, the present invention is by no means limited to this shape of water-absorbing cloth 120, and may adopt a shape by which the entire surface having the air supply grooves 116 formed therein is covered.

Although the second embodiment was explained referring to the case where the water-absorbing cloths 120, 121 were provided, the present invention may be adopted also to a case where only the water-absorbing cloth 121 is provided, so far as the water-absorbing cloth 121 can efficiently discharge the water to the external.

Although the second embodiment was explained referring to the case where the water-absorbing cloths 120, 121 were used as the means for disposing the water, the present invention may adopt any other means different from the water-absorbing cloths 120, 121.

One exemplary means for disposing the water is such as scratching the sidewall or bottom surface of the air supply grooves so as to roughen the surface of the air supply grooves. Another means for disposing the water is such as forming a highly-water-repellent region in the air supply grooves, which is exemplified by use of a highly-water-repellent material including Teflon (registered trademark) or silicone for the air supply grooves, or by water-repellent finish of the air supply grooves through a plasma treatment using fluorine gas. Still another means for disposing the water is such as combining the plurality of means.

At all events, the present invention is applicable in any forms so far as it provides a means for disposing the water produced during power generation by the power generator at least on the midway portion of the air supply grooves.

Although the second embodiment was explained referring to the fuel cell 150 as a specific application of the separator 110, the present invention is by no means applicable only to the fuel cell 150, but also applicable to any devices which can be using the separator having the means for disposing the water provided thereto.

A water disposal system exemplified as a third embodiment will be explained.

The third embodiment is a further modification of the above-described first and second embodiments, aiming at further raising efficiencies in water absorption and collection of generated electricity, by providing a water-absorbing layer having at least water absorbency, air permeability and electro-conductivity, between the diffusion layer and the collector which serves as the current collector.

Figure 18:
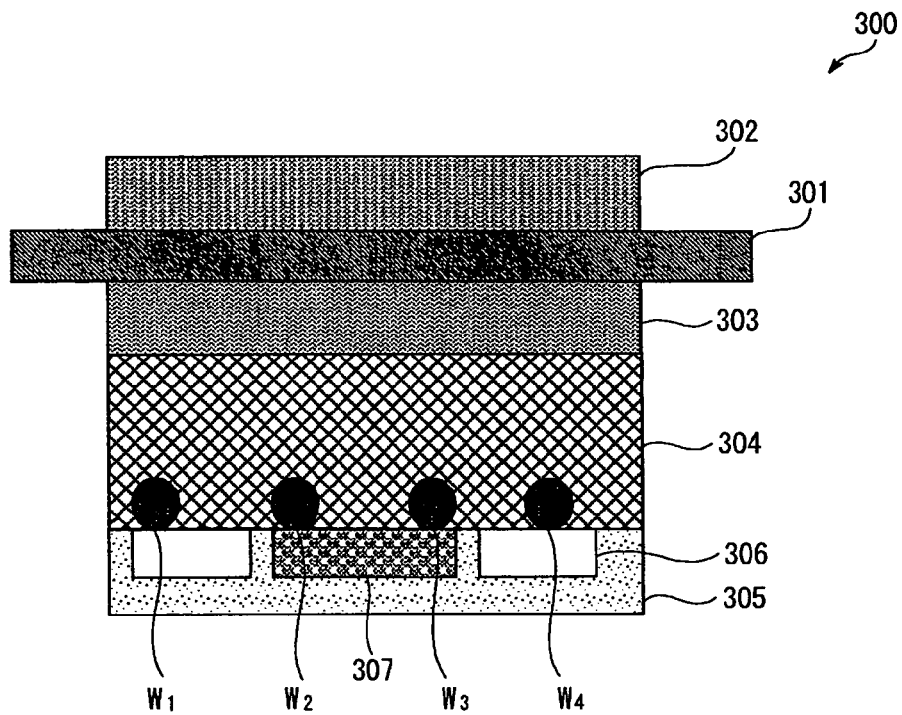
FIG. 18 is a sectional view showing a configuration of a fuel cell in which a water-absorbing cloth is in contact with only a part of a carbon fiber layer as a diffusion layer.

In the aforementioned first and second embodiments, it was explained, referring to a fuel cell 300 as the power generation apparatus shown in FIG. 18, that the water, produced during the power generation in a hydrogen-side catalyst layer 302 and an oxygen-side catalyst layer 303 placed on both sides of a predetermined electrolyte film 301, moves to a carbon fiber layer 304 which is a diffusion layer composed of a paper-sheet-formed carbon fiber with a water-repellent finish, and the water is then absorbed by a water-absorbing member and a water-absorbing cloth (generally referred to as a water-absorbing cloth 307, hereinafter) provided around air supply grooves 306 formed on the separator 305.

The water-absorbing cloth 307 herein is brought into contact with only a part of the carbon fiber layer 304 which serves as the diffusion layer. Denoting now the water which resides in the carbon fiber layer 304 as W1, W2, W3 and W4 depending on the locations thereof for convenience, only the waters W2, W3, which reside in the vicinity of the carbon fiber layer 304 to which the water-absorbing cloth 307 is brought into contact, or only the water discharged from the carbon fiber layer 304 and reaches the air supply grooves 306 can be absorbed by the water-absorbing cloth 307.

Increase in the area of the water-absorbing cloth 307 in contact with the carbon fiber layer 304 may be successful in efficiently discharging the water from the carbon fiber layer 304, but provision of the water-absorbing cloth 307 over the entire region of the separator 305 in the fuel cell 300 will make it difficult to collect the generated electricity by the separator 305, because the water-absorbing cloth 307 has no electro-conductivity.

Figure 19:
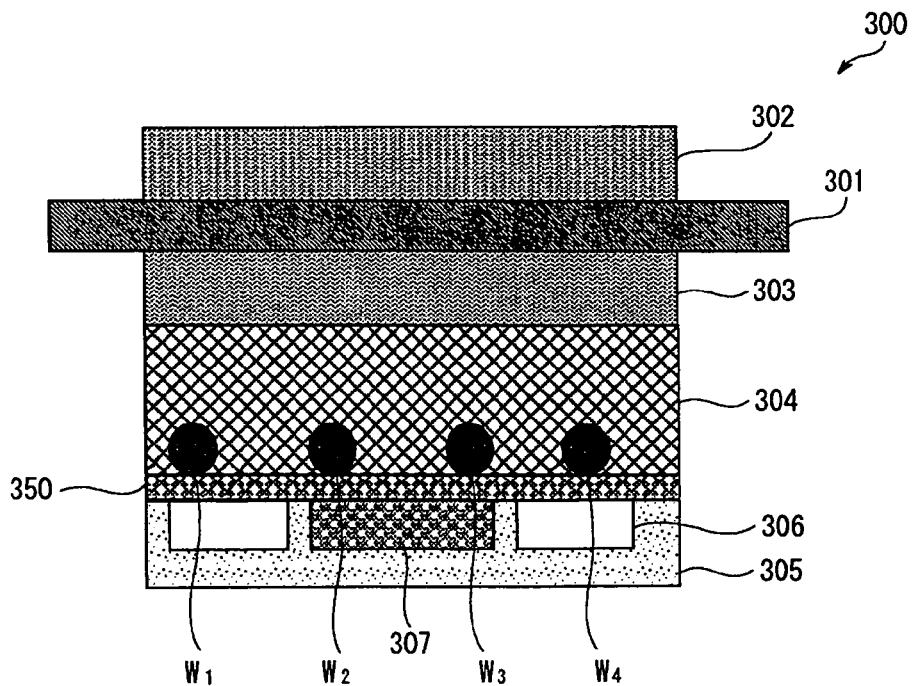
FIG. 19 is a sectional view showing a configuration of a fuel cell exemplified as a third embodiment of the present invention.

A fuel cell 300' shown in FIG. 19 was then proposed, in which a water-absorbing layer 350 having at least water-absorbency, water permeability and electro-conductivity, is provided between the carbon fiber layer 304 and the separator 305.

In thus-configured fuel cell 300', the waters W1, W2, W3, W4 which reside in the carbon fiber layer 304 are once absorbed by the water-absorbing layer 350, and are then diffused within the water-absorbing layer 350. In the fuel cell 300', the water absorbed by the water-absorbing layer 350 is further sucked up by the water-absorbing cloth 307 in contact with a part of the water-absorbing layer 350, and is then discharged through the water-absorbing cloth 307 to the external.

The water-absorbing layer 350 can be formed by mixing a carbon black such as "Ketjenblack" manufactured by Ketjenblack International Corporation, with a hydrophilic binder such as polyimide using a solvent such as NPA, and by coating thus-obtained ink over the nearly-entire surface of the separator 305.

Other materials available for the water-absorbing layer 350 include a synthetic metal fiber subjected to hydrophilization treatment, and a mixture of the above-described, high-water-absorption, yarn-like fiber causing capillary phenomenon with carbon or metal.

As described in the above, by providing a water-absorbing layer 350 having at least water absorbency, air permeability and electro-conductivity, between the carbon fiber layer 304 and the separator 350, the fuel cell 300' can absorb the water in a more efficient manner, and this also makes it possible to efficiently collect generated electricity by the separator 305.

As has been described in the above, the water disposal system and the fuel cell (power generation apparatus) exemplified as the embodiments of the present invention can dispose the water in extremely efficient and reliable manners by being provided with the water-absorbing material.

It is to be understood that the present invention is by no means limited to the above-descried embodiments. For example, the above-described embodiments dealt with specific examples of the water-absorbing member and water-absorbing cloth differed from embodiment to embodiment, but the present invention is applicable also to a case where the component represented by these specific examples is commonly used for these embodiments.

It is contemplated that the present invention can include the combination of the above-described embodiments within a possible range.

As has been detailed in the above, the water disposal system, the method of disposing water, and the power generation apparatus of the present invention respectively make it possible to recover the water produced during power generation using the water-absorbing member, and allow the water to evaporate from the water-absorbing member into the air for disposal, and thereby make it possible to dispose the water produced during power generation to the external without allowing it to stagnate inside the power generator.

The water disposal system, the method of disposing water, and the power generation apparatus of the present invention, in which the water can be disposed by the water disposal means provided at least on the midway of the oxidizer supply grooves, are successful in avoiding clogging of the oxidizer supply grooves due to the water stagnated therein, and in avoiding interference of the flow of the oxidizer gas through the oxidizer supply groove.

Therefore, the water disposal system, the method of disposing water, and the power generation apparatus of the present invention can respectively dispose the water in efficient and reliable manners under an extremely simple configuration, without using any complicated mechanism including a pump or newly-formed flow path, and can thereby stabilize the power generation efficiency.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A power generation apparatus for generating electric power by supplying a fuel gas and an oxidizer gas such that the fuel gas and the oxidizer gas can electrochemically react with each other, comprising:

a power generator having a predetermined electrolyte film provided between a first electrode and a second electrode;

a separator having, formed thereon, a fuel supply groove for supplying the fuel gas to the first electrode and an oxidizer supply groove for supplying the oxidizer gas to the second electrode, and for holding the power generator; and a water-absorbing member for absorbing water generated during power generation by the power generator, provided at least on a midway portion of the oxidizer supply groove, the water-absorbing member having strip-formed regions extending in a direction substantially perpendicular to a direction of the oxidizer supply groove, wherein the water-absorbing member comprises a three-layered structure in which a two-layered structure, including a first material having a water-absorbing/releasing property and a second material having a water absorbing property bonded with each other, is further bonded with a predetermined tape material on the lower side of the second material, the tape material having a rigidity that reduces any sagging of the strip-formed regions of the water-absorbing member that extend over the oxidizer supply grooves, and wherein the second material includes a material absorbing the water by utilizing capillary phenomenon.

2. The power generation apparatus according to claim 1, wherein the water-absorbing member is further provided along at least a partial region of a shiewall of the oxidizer supply groove.

3. The power generation apparatus according to claim 2, wherein the water-absorbing member is provided so as to cover at least a part of the surface having the oxidizer supply groove formed therein.

4. The power generation apparatus according to claim 3, wherein
the separator includes a radiating fin for dissipating heat of the power generator; and
the water-absorbing member includes a region extended from a surface of the radiating fin of the separator and another region that covers at least a part of the oxidizer supply groove.

5. The power generation apparatus according to claim 1, wherein the water-absorbing member is an aggregate of string-formed fiber having a void portion formed therein in a longitudinal direction.

6. The power generation apparatus according to claim 1, wherein the water-absorbing member includes the oxidizer supply groove having a roughened surface.

7. The power generation apparatus according to claim 1, wherein the water-absorbing member includes the oxidizer supply groove having a high water-repellent region formed therein.

8. The power generation apparatus according to claim 1, wherein the water-absorbing member includes the oxidizer supply groove having a high hydrophilic region formed therein.

9. The power generation apparatus according to claim 1, wherein the fuel gas includes a hydrogen gas; and
the oxidizer gas includes air including oxygen.

10. The power generation apparatus according to claim 1, further comprising a power generation section having a stacked structure in which a plurality of elements holding the power generator by the separator is stacked.

11. The power generation apparatus according to claim 1, further comprising a water-absorbing layer having at least water absorbency, air permeability and electro-conductivity, provided between a diffusion layer and the separator.

* * * * *